(12) United States Patent
Liang et al.

(10) Patent No.: US 8,772,414 B2
(45) Date of Patent: Jul. 8, 2014

(54) POLYMERIC COMPOSITIONS AND FOAMS, METHODS OF MAKING THE SAME, AND ARTICLES PREPARED FROM THE SAME

(75) Inventors: Wenbin Liang, Pearland, TX (US); Brian W. Walther, Clute, TX (US); Gary R. Marchand, Lake Jackson, TX (US)

(73) Assignee: Dow Global Technologies LLC, Midlane, MI (US)

( * ) Notice: Subject to any disclaimer, the term of this patent is extended or adjusted under 35 U.S.C. 154(b) by 232 days.

(21) Appl. No.: 13/062,241

(22) PCT Filed: Sep. 16, 2009

(86) PCT No.: PCT/US2009/057165
§ 371 (c)(1), (2), (4) Date: Mar. 4, 2011

(87) PCT Pub. No.: WO2010/033601
PCT Pub. Date: Mar. 25, 2010

(65) Prior Publication Data
US 2011/0160323 A1    Jun. 30, 2011

Related U.S. Application Data

(60) Provisional application No. 61/097,243, filed on Sep. 16, 2008.

(51) Int. Cl.
| | | |
|---|---|---|
| C08F 8/00 | (2006.01) |
| C08F 8/30 | (2006.01) |
| C08F 8/34 | (2006.01) |
| C08F 210/18 | (2006.01) |
| C08F 236/20 | (2006.01) |

(52) U.S. Cl.
USPC .......... 525/331.8; 525/332.7; 525/332.8; 525/332.9; 525/344; 525/351

(58) Field of Classification Search
USPC ........... 521/89, 96, 142, 150; 526/283, 336; 525/331.8, 332.7, 332.8, 332.9, 344, 525/351
See application file for complete search history.

(56) References Cited

U.S. PATENT DOCUMENTS

| | | |
|---|---|---|
| 3,645,992 A | 2/1972 | Elston |
| 4,076,698 A | 2/1978 | Anderson et al. |
| 4,544,762 A | 10/1985 | Kaminsky et al. |
| 4,722,971 A | 2/1988 | Datta et al. |
| 5,015,749 A | 5/1991 | Schmidt et al. |
| 5,041,584 A | 8/1991 | Crapo et al. |
| 5,206,075 A | 4/1993 | Hodgson, Jr. |
| 5,229,478 A | 7/1993 | Floyd et al. |
| 5,241,031 A | 8/1993 | Mehta |
| 5,242,971 A | 9/1993 | Nakahama et al. |
| 5,272,236 A | 12/1993 | Lai et al. |
| 5,278,272 A | 1/1994 | Lai et al. |
| 5,869,591 A | 2/1999 | McKay et al. |
| 5,973,017 A | 10/1999 | Okita et al. |
| 6,040,351 A | 3/2000 | Okita et al. |
| 6,143,829 A | 11/2000 | Babb et al. |
| 6,319,998 B1 | 11/2001 | Cozewith et al. |
| 6,325,956 B2 | 12/2001 | Chaudhary et al. |
| 6,376,623 B1 | 4/2002 | Hoenig et al. |
| 6,506,848 B2 * | 1/2003 | Hoenig et al. ............. 525/331.8 |
| 6,528,136 B1 | 3/2003 | Ho et al. |
| 6,531,546 B2 | 3/2003 | Oka et al. |
| 6,552,129 B2 | 4/2003 | Babb et al. |
| 6,680,361 B1 | 1/2004 | Cady et al. |
| 6,747,099 B1 | 6/2004 | Novits et al. |
| 6,777,502 B2 | 8/2004 | Ho et al. |
| 7,199,189 B2 | 4/2007 | Ravishankar et al. |

FOREIGN PATENT DOCUMENTS

| | | |
|---|---|---|
| EP | 0 277 003 A1 | 8/1988 |
| EP | 0 277 004 A1 | 8/1988 |
| EP | 0 129 368 B1 | 7/1989 |
| EP | 632065 A1 | 1/1995 |
| WO | 90/03414 A1 | 4/1990 |
| WO | 93/03093 A1 | 2/1993 |
| WO | 93/19107 A1 | 9/1993 |
| WO | 9910425 A1 | 3/1999 |
| WO | 01/72894 A1 | 10/2001 |
| WO | 02/12377 A2 | 2/2002 |
| WO | 2005/023924 | 3/2005 |
| WO | 2005/090427 A1 | 9/2005 |
| WO | 2006065651 A2 | 6/2006 |

OTHER PUBLICATIONS

PCT/US09/057165 Intl Preliminary Report on Patentability.
PCT/US09/057165 Intl Search Report.
PCT/US09/057165 Written Opinion.

* cited by examiner

*Primary Examiner* — Kara Boyle (57) ABSTRACT

The invention provides a composition comprising an ethylene/α-olefin/non-conjugated diene interpolymer, which has the following properties: an $M_z(abs)/M_z(Conv)$ value greater than 1.35; an $M_z(BB)/M_w(abs)$ value greater than 1.6; and a non-conjugated diene content less than 10 weight percent, based on the total weight of the interpolymer.

14 Claims, 1 Drawing Sheet

POLYMERIC COMPOSITIONS AND FOAMS, METHODS OF MAKING THE SAME, AND ARTICLES PREPARED FROM THE SAME

REFERENCE TO RELATED APPLICATIONS

This application claims the benefit of U.S. Provisional Application No. 61/097,243, filed on Sep. 16, 2008, and fully incorporated herein by reference.

BACKGROUND OF THE INVENTION

For the manufacturing of low density, high performance EPDM foams (sponge), higher double-bond content is generally required (for example, 5-ethylidenenorbornene (ENB) content over 7.5%) for faster curing and higher ultimate crosslink density for improved cellular foam structure and improved mechanical properties, such as compression set resistance. However, high levels of ENB increase the cost of the EPDM rubbers, since the ENB is an expensive raw material. In addition, interpolymers containing high levels of ENB result in cured, shaped formulations with short scorch times, which lead to processing problems.

Alternatively, EPDM rubbers with high molecular weight are often used to improve melt strength and foaming control during foam production. However, high molecular weight EPDM often exhibits poorer processibility, leading to difficulties in mixing with other additives, higher extruder torque and high tendency for melt fracture at the surface of the fabricated articles.

There is a need for a rubber composition comprising an ethylene/α-olefin/non-conjugated diene copolymer rubber, which contains low levels of diene, exhibits superior processibility, produces formed products with excellent surfaces, and has excellent mechanical characteristics, low water absorption, and superior low and high temperature properties.

U.S. Pat. No. 6,777,502 discloses coupled polymers prepared by a process comprising heating an admixture containing (1) at least one polyolefin comprising ethylene and optionally at least one comonomer, and (2) a coupling amount at least one poly(sulfonyl azide), to at least the decomposition temperature of the poly(sulfonyl azide), for a period sufficient for decomposition of at least 80 weight percent of the poly(sulfonyl azide), and sufficient to result in a coupled polymer. In particular, the polyolefin is the product of the polymerization of ethylene, and optionally at least one other alpha-olefin, in the presence of a single site catalyst. However, the polymers (low molecular weight and/or broad molecular weight distributions) cannot be used to form foams with good compression set and low water absorption because of limited melt viscosity and elasticity to support closed-cell foam and limited crosslinking efficiency. Typically, an ethylene/α-olefin/non-conjugated diene interpolymer with high molecular weight and narrow molecular weight distribution exhibit higher crosslinking efficiency, and is preferably used to form a good crosslinked foam structure. See also U.S. Pat. No. 6,528,136.

U.S. Pat. No. 6,506,848 discloses a process for preparing a coupled polymer comprising heating an admixture containing (1) at least one elastomer comprising ethylene and at least one comonomer, which is selected from alpha olefins having at least three carbon atoms, dienes and combinations thereof, and (2) a coupling amount at least one poly(sulfonyl azide), to at least the decomposition temperature of the poly(sulfonyl azide), for a period sufficient for decomposition of at least 80 weight percent of the poly(sulfonyl azide) and sufficient to result in a coupled polymer having a gel content of less than 2 weight percent. However, the polymers (low molecular weight and/or broad molecular weight distributions) cannot be used to form foams with good compression set and low water absorption. See also U.S. Pat. No. 6,376,623.

U.S. Pat. No. 6,552,129 discloses a process of reacting a poly(sulfonyl azide) with a polymer comprising the following steps: (a) forming a first admixture of a first amount of a first polymer or in a liquid which does not require removal from the polymer and a poly(sulfonyl azide); (b) then forming a second admixture of the first admixture with a second amount of at least one second polymer; and (c) heating the second admixture at least to the decomposition temperature of the coupling agent, for a time sufficient to result in coupling of polymer chains. However, the polymers (low molecular weight and/or broad molecular weight distributions) cannot be used to form foams with good compression set and low water absorption. See also U.S. Pat. No. 6,143,829.

U.S. Pat. No. 6,325,956 discloses a process comprising (a) forming a polymeric admixture including at least one polyolefin which has been prepared using a single site catalyst and at least a crosslinking amount of at least one poly(sulfonyl azide) crosslinking agent; (b) shaping the resulting admixture; and (c) heating the resulting shaped admixture to a temperature at least the decomposition temperature of the crosslinking agent. The compositions are fully crosslinked which limits further formulation flexibility with other thermoplastically formable polymers and other additives in forming new shaped articles.

U.S. Pat. No. 5,869,591 discloses a thermoset elastomer comprising a crosslinked pseudorandom or substantially random interpolymer comprising: (a) from 15 to 70 weight percent of monomer units derived from at least one α-olefin, (b) from 30 to 70 weight percent of monomer units derived from at least one vinylidene aromatic compound, and (c) from 0 to 15 weight percent of monomer units derived from at least one diene. The compositions are fully crosslinked.

Additional rheology modified, crosslinked and/or polymer blends are disclosed in the following: International Publication Nos. WO 00/26268 and WO 2006/065651; and U.S. Pat. Nos. 7,199,189; 6,531,546; 6,319,998; 6,040,351; 5,973,017; 5,229,478; 5,242,971; and 4,722,971.

As discussed above, there is a need for EPDM-based formulations, which contain relatively lower levels of ENB, and which have cure rates similar to formulations containing higher ENB interpolymers. There is a further need for crosslinked foams that can be formed from formulations that have longer scorch times. There is yet another need for EPDM-based formulations with improved processibility in ease of mixing, lower extruder torque and improved surface aesthetics due to reduced tendency for melt fracture.

There is also a need for an ethylene/α-olefin/non-conjugated diene copolymer rubber composition capable of producing foamed, vulcanized rubber articles with excellent cellular structure control, thermal and mechanical properties, and improved water repellency. There is a further need for foamable articles that can be made via extrusion, compression molding, injection molding, and other processes. These needs and others have been met by the following invention.

SUMMARY OF THE INVENTION

The invention provides a composition comprising an ethylene/α-olefin/non-conjugated diene interpolymer, which has the following properties: an $M_z(abs)/M_z(Conv)$ value greater than 1.35; an $M_z(BB)/M_w(abs)$ value greater than 1.6; and a non-conjugated diene content less than 10 weight percent, based on the total weight of the interpolymer.

The invention also provides a process for forming a crosslinked composition, said process comprising:
(a) forming a polymeric admixture comprises of at least the following:
   (A) an ethylene/α-olefin/non-conjugated diene copolymer rubber (B) which has the following properties: an $M_z(abs)/M_z(Conv)$ value less than 1.3; an $M_z(BB)/M_w(abs)$ value greater than 1.6, but less than 2.5; and an $M_w(abs)$ value less than 350,000 g/mole; and
   (B) a coupling amount of (i) at least one poly(sulfonyl azide) or (ii) at least one peroxide; and
(b) heating the resulting admixture to a temperature of at least the decomposition temperature of the crosslinking agent.

The invention also provides a process for forming a shaped article, said process comprising: (a) forming a polymeric admixture comprised of at least one ethylene/α-olefin/non-conjugated diene interpolymer, at least one sulfur-based curative or organic peroxide-based crosslinking agent, and, optionally, a process oil, carbon blacks, additional inorganic fillers, organic fillers, cure accelerators, and/or foaming agents; (b) shaping the resulting admixture; (c) heating the resulting admixture to a temperature of at least the decomposition temperature of the sulfur-based cure agent or the peroxide crosslinking agent.

DETAILED DESCRIPTION OF THE INVENTION

As discussed above, the invention provide a composition comprising an ethylene/α-olefin/non-conjugated diene interpolymer, which has the following properties: an $M_z(abs)/M_z(Conv)$ value greater than 1.35, preferably greater than 1.38; an $M_z(BB)/M_w(abs)$ value greater than 1.6, preferably greater than 1.8, and more preferably greater than 2.0; and a non-conjugated diene content less than 10 weight percent, preferably less than 9 weight percent, and more preferably less than 8 weight percent, even more preferably less than 7.5 weight percent, based on the total weight of the interpolymer.

In one embodiment, the interpolymer has a Mooney viscosity (ML 1+4 at 125° C.) greater than 70, preferably greater than 80.

In one embodiment, the interpolymer has a Mooney viscosity (ML 1+4 at 125° C.) less than 300, preferably less than 240, more preferably less than 200.

In one embodiment, the interpolymer has a Mooney viscosity (ML 1+4 at 125° C.) less than 180, preferably less than 150.

In one embodiment, the interpolymer has a melt viscosity at 190° C., greater than $2.0 \times 10^5$ Pa·sec, preferably greater than $2.5 \times 10^5$ Pa·sec, more preferably greater than $3.0 \times 10^5$ Pa·sec, and even more preferably greater than $3.5 \times 10^5$ Pa·sec.

In one embodiment, the interpolymer has a viscosity ratio ($\eta 0.1/\eta 100$), at 190° C., from 70 to 300, preferably from 70 to 280.

In one embodiment, the interpolymer has a gel content less than 3 weight percent, preferably less than 2 weight percent, more preferably less than 1 weight percent, and even more preferably less than 0.5 weight percent.

In a preferred embodiment, the interpolymer is formed by reacting at least the following: a base ethylene/α-olefin/non-conjugated diene interpolymer and a coupling agent. In a further embodiment, the coupling agent is an azide compound.

In another embodiment, the coupling agent is a peroxide. In a further embodiment, the weight ratio of the peroxide to the base ethylene/α-olefin/non-conjugated diene interpolymer is greater than 0.0004, preferably greater than 0.0008, more preferably greater than 0.0010, and less than 0.0020, preferably less than 0.0016.

In one embodiment, the weight ratio of azide to base interpolymer is greater than 0.00020, preferably greater than 0.00030; and more preferably greater than 0.00040; and less than 0.0030, preferably less than 0.0020, and more preferably less than 0.0015.

In one embodiment, the percent change in melt viscosity at 0.1 rad/sec (190° C.) in the inventive ethylene/α-olefin/non-conjugated diene interpolymer (after coupling treatment) and the base ethylene/α-olefin/non-conjugated diene interpolymer (before coupling treatment) is greater than 130%, preferably greater than 150%, and more preferably greater than 180%. Here, % Change in $\eta 0.1 = \{[\eta 0.1(\text{after coupling (inventive interpolymer)}) - \eta 0.1(\text{before coupling (base interpolymer)})]/\eta 0.1(\text{before coupling}) \times 100\}$. In a further embodiment, the percent change in melt viscosity at 0.1 rad/sec (190° C.) in the inventive ethylene/α-olefin/non-conjugated diene interpolymer (after coupling treatment) and the base ethylene/α-olefin/non-conjugated diene interpolymer (before coupling treatment) is less than 2000%, preferably less than 1500%, and more preferably greater than 1200%. In a further embodiment, the inventive interpolymer has a gel content less than 3 weight percent, preferably less than 2 weight percent, more preferably less than 1 weight percent, and even more preferably less than 0.5 weight percent.

The invention also provides a process for forming a crosslinked composition comprising:
(a) forming a polymeric admixture comprising at least the following:
   (A) an ethylene/α-olefin/non-conjugated diene copolymer rubber (B) which has the following properties: an $M_z(abs)/M_z(Conv)$ value less than 1.3; an $M_z(BB)/M_w(abs)$ value greater than 1.6, but less than 2.5; and an $M_w(abs)$ value less than 350,000, preferably less than 250,000 g/mol; and
   (B) a coupling amount of (i) at least one poly(sulfonyl azide or (ii) at least one peroxide; and
(b) heating the resulting admixture to a temperature of at least the decomposition temperature of the crosslinking agent. As used herein a coupling amount of azide or peroxide is an amount that results in a coupled interpolymer with a gel content less than 3 weight percent, preferably less than 2 weight percent, more preferably less than 1 weight percent. In one embodiment the polymeric admixture further comprises an oil and/or a filler.

The invention also provides a process for forming a shaped article, said process comprising: (a) forming a polymeric admixture comprised of at least one ethylene/α-olefin/non-conjugated diene interpolymer, at least one sulfur-based curative or organic peroxide-based crosslinking agent, and, optionally, a process oil, carbon blacks, additional inorganic fillers, organic fillers, cure accelerators, and/or foaming agents; (b) shaping the resulting admixture; (c) heating the resulting admixture to a temperature of at least the decomposition temperature of the sulfur-based cure agent or the peroxide crosslinking agent. In a preferred embodiment, the ethylene/α-olefin/non-conjugated diene interpolymer is an EPDM interpolymer (A) as discussed below. In a further embodiment, the resulting admixture is shaped by a process selected from profile extrusion, overmolding, or injection molding, preferably from profile extrusion or overmolding, more preferably by profile extrusion. In a further embodiment, the article is a foam. In a further embodiment, the foam has the following properties: density of 0.2 to 0.8 g/cc and more preferably a density of 0.3 to 0.7 g/cc.

Suitable additives include, but are not limited to, processing oil, carbon black, calcium carbonate, and other inorganic fillers such as talc, zeolites, clays, silicates, TiO2, optionally organic fillers, sulfonyl azide crosslinking agent, organic peroxide crosslinking agent, sulfur-based crosslinking agent, cure accelerators, foaming agents, other process additives such as zinc oxide, zinc stearate, and stearic acid.

Suitable processes for forming the polymeric admixture into a shaped articles include thermoforming, compression molding, injection molding, extrusion (cast, blow molded, blown), profile extrusion, and others methods commonly knowledgeable to those skilled in the art.

The process of forming a polymeric admixture includes, but not limited to extruder, Haake-type mixer, Henschel mixer, roll mixer, Banbury mixer, calendaring machine and other likes.

The rubber composition of the present invention can be suitably used for a wide variety of applications such as a hose, sponge material, elastomeric sealing material, belts, electric insulating material, and the like.

The composition of this invention exhibit process advantages in improved shape retention, dimensional stability, surface characteristics (less melt fracture), longer scorch time during cure/crosslinking, and high cure rate. Foamed articles of this invention exhibit advantages in dimensional stability, excellent thermal and mechanical properties, significantly improved water repellency.

In one embodiment, the composition comprises: EPDM interpolymer (A) which has: an Mz(abs)/Mz(Conv) values greater than 1.3, preferably greater than 1.35, an Mz(BB)/Mw (abs) values greater than 1.6, preferably greater than 1.8, an ENB (or non-conjugated diene) content less than 10 weight percent, preferably less than 9 weight percent, more preferably less than 8 weight percent, even more preferably less than 7.5 weight percent, based on the total weight of the interpolymer.

In one embodiment, an inventive ethylene/α-olefin/non-conjugated diene interpolymer is formed from an EPDM interpolymer (B), and wherein the EPDM interpolymer B has: an Mz(abs)/Mz(Conv) values lower than 1.3; an Mz(BB)/Mw(abs) values higher than 1.6 but less than 2.5; and an Mw(abs) values less than 350,000, preferably less than 250,000 g/mole.

The invention also provides a composition comprising: an EDPM interpolymer (B) at 30-100 wt %, preferably 50-100 wt %, more preferably 60-100 wt %; a process oil at 0-60 wt %, preferably at 0-50 wt %; one or more inorganic fillers such as calcium carbonate and/or carbon black at 0-60 wt %, preferably at 0-40 wt %; and a sulfonyl azide crosslinking agent or an organic peroxide crosslinking agent, either before decomposition, at 0.01-2 wt %, preferably at 0.02-1 wt %, more preferably at 0.02-0.5 wt %. Each weight percent is based on the total weight of the composition.

In one embodiment, the composition comprises: an EPDM interpolymer (A) at 20-100 wt %, preferably 25-70 wt %, more preferably 30-50 wt %; a process oil at 0-70 wt %, preferably at 25-60 wt %, more preferably 30-50 wt %; carbon black at 0-60 wt %, preferably at 25-50 wt %, more preferably 30-50 wt %; calcium carbonate and/or other inorganic fillers at 0-50 wt %, preferably at 5-30 wt %, more preferably 5-20 wt %; a sulfur based cure/vulcanization agents at 0-7 wt %, preferably at 2-6 wt %, more preferably 3-5 wt %; one or more vulcanization coagents at 0-4 wt %; and a chemical foaming agent at 0-7 wt %, preferably at 2-6 wt %, more preferably 3-5 wt %. Each weight percent is based on the total weight of the composition.

The invention also provides an article comprising at least one component formed from an inventive composition. In a further embodiment, the component is formed from a composition comprising: an EPDM interpolymer (A) at 20-100 wt %, preferably 25-70 wt %, more preferably 30-50 wt %; a process oil at 0-70 wt %, preferably at 25-60 wt %, more preferably 30-50 wt %; carbon black at 0-60 wt %, preferably at 25-50 wt %, more preferably 30-50 wt %; calcium carbonate and/or other inorganic fillers at 0-50 wt %, preferably at 5-30 wt %, more preferably 5-20 wt %; a sulfur based cure/vulcanization agents at 0-7 wt %, preferably at 2-6 wt %, more preferably 3-5 wt %; one or more vulcanization coagents at 0-4 wt %; and a chemical foaming agent at 0-7 wt %, preferably at 2-6 wt %, more preferably 3-5 wt %. Each weight percent is based on the total weight of the composition. In a further embodiment, the article, or component therein, is a vulcanized foam with a density from 0.2 to 0.8 g/cc, preferably from 0.3 to 0.7 g/cc, more preferably from 0.4 to 0.7 g/cc.

Unexpectedly, cured, foamed articles formed from compositions of this invention, wherein the EPDM interpolymer (A or/and B) has lower ENB content of less than 7.5 weight percent, or the total ENB content is less than 6.5 weight percent of the total weight of the polymerized monomer, and wherein the molecular weight Mw(abs) of the EPDM rubber B is less than 350,000 g/mol, exhibited comparable or even higher cure rate, improved foam cellular structure and ultimately lower water absorption, which is desirable for sealing and other automotive applications, compared with compositions with other EPDM interpoloymers of higher ENB content (ENB higher than 7.5 weight percent) and/or higher molecular weight (Mw(abs) higher than 350,000 g/mol).

Cured, foamed articles of this invention where the EPDM interpolymers comprise a blends of one or more EPDM interpolymers (A) of this invention (at 20-50 wt % of the total EPDM) with one or more of EPDM interpolymers (B) (at 50-80 wt %) exhibited comparable mechanical properties, as well as water absorption, compared with cured, foamed articles comprised of one or more EPDM rubbers (A) (at 100 wt %) of this invention.

The EPDM interpolymers (A) of this invention can be used in compositions has as performance enhancing components at substantially reduced levels, and still providing desirable improvement in performance of a cured, foamed article.

The invention can be used to form non-foamed articles where excellent processability characteristics are required such as in flexible extruded profiles.

EPDM with lower ENB content and low molecular weight of this invention exhibited high melt strength, high melt elasticity, support closed cell formation during cure and foaming, as opposed to conventionally required high ENB content and high molecular weight. More specifically, the EPDM rubber-based cured, foamed articles have improved sagging resistance, improved scorch resistance, improved (fast) cure rate, improved cellular structure, and ultimately improved water repellency.

EPDM interpolymer (A) which has: an Mz(abs)/Mz(Conv) values greater than 1.3, preferably greater than 1.35, an Mz(BB)/Mw(abs) values greater than 1.6, preferably greater than 1.8, an ENB (or non-conjugated diene) content less than 10 weight percent, preferably less than 9 weight percent, more preferably less than 8 weight percent, even more preferably less than 7.5 weight percent, based on the total weight of the interpolymer.

EPDM iterpolymers (B) have relatively high molecular weight (high Mooney), and relatively narrow MWD, and preferably are homogeneously branched based interpolymer. It has been shown that these interpolymers provide high increase in melt elasticity and high cure efficiency upon rheology modification, using a coupling agent such as azide or peroxide, at levels comparable with EPDMs with a lower molecular weight and/or a broader molecular weight distribution.

Tan delta is also known as the dampening peak or the dissipation factor, which is defined as the ratio of the loss modulus to the storage modulus. The tan delta value is a very good indicator to gauge the balance of melt strength to ability to flow as it is, in its definition, a ratio of the viscous component to the elastic component. As the tan delta goes up or is higher, the material is more fluid and as the tan delta is lower, the material is more elastic in nature, or has higher melt elasticity. Tan delta is well known to those skilled in the art defined and described in L. E. Nielson, Mechanical Properties of Polymers and Composites Volume 1, Marcel Dekker, Inc. pp. 139-150 (1974), incorporated herein by reference. Preferably, the tan delta @ 190° C. of the EPDM rubbers (A) compositions of this invention is from 0.3 to 1.0, more preferably from 0.4 to 0.95.

An inventive interpolymer may comprise a combination of two or more embodiments as described herein.

An inventive composition may comprise a combination of two or more embodiments as described herein.

An inventive article may comprise a combination of two or more embodiments as described herein.

An inventive foam may comprise a combination of two or more embodiments as described herein.

Inventive Ethylene/α-Olefin/Diene Interpolymers and Base Ethylene/α-Olefin/Diene Interpolymers In one embodiment, the ethylene/α-olefin/nonconjugated diene interpolymers of the present invention, and base ethylene/α-olefin/nonconjugated diene interpolymers (used to form inventive interpolymers), have polymerized therein C2 (ethylene), at least one C3-C20 α-olefin (ethylenically unsaturated) monomer, and, typically, a C4-C40 nonconjugated diene. The α-olefin may be either an aliphatic or an aromatic compound, and may contain vinylic unsaturation or a cyclic compound, such as styrene, p-methyl styrene, cyclobutene, cyclopentene, and norbornene, including norbornene substituted in the 5 and 6 position with C1-C20 hydrocarbyl groups.

The α-olefin is preferably a C3-C20 aliphatic compound, preferably a C3-C16 aliphatic compound, and more preferably a C3-C10 aliphatic compound. Preferred ethylenically unsaturated monomers include 4-vinylcyclohexene, vinylcyclohexane, and C3-C10 aliphatic α-olefins (especially propylene, isobutylene, 1-butene, 1-pentene, 1-hexene, 3-methyl-1-pentene, 4-methyl-1-pentene, 1-octene, 1-decene and 1-dodecene). A more preferred C3-C10 aliphatic α-olefin is selected from the group consisting of propylene, 1-butene, 1-hexene and 1-octene, and more preferably propylene. In a preferred embodiment, the interpolymer is an EPDM interpolymer. In a further embodiment, the diene is 5-ethylidene-2-norbornene (ENB).

In one embodiment, the interpolymer has a C2 (ethylene) content of from 45 to 95 weight percent, more preferably from 51 to 90 weight percent, and most preferably from 55 to 85 weight percent, based on the total weight of polymerized monomers.

In one embodiment, the weight ratio of ethylene to α-olefin in the interpolymer is less than 2.5.

In one embodiment, the α-olefin of the interpolymer is propylene.

In one embodiment, the nonconjugated diene is a C6-C15 straight chain, branched chain or cyclic hydrocarbon diene. Illustrative nonconjugated dienes are straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-peptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The diene is preferably a nonconjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB. In one embodiment, the amount (wt %) of ENB in an interpolymer is determined by FTIR as described below.

Preferred interpolymers of the present invention have polymerized therein ethylene at least one α-olefin and 5-ethylidene-2-norbornene (ENB). The α-olefin is preferably a C3-C20 aliphatic compound, more preferably a C3-C12 aliphatic compound, and even more preferably a C3-C8 aliphatic compound. Preferred α-olefins include propylene, 1-butene, 1-pentene, 1-hexene, 3-methyl-1-pentene, 4-methyl-1-pentene, 1-heptene, 1-octene, 1-decene and 1-dodecene. More preferred α-olefins include propylene, 1-butene, 1-hexene and 1-octene, and most preferably propylene. In a preferred embodiment, the interpolymer has polymerized therein ethylene, propylene and 5-ethylidene-2-norbornene.

An inventive interpolymer may comprise a combination of two or more embodiments as described herein.

A base interpolymer may comprise a combination of two or more embodiments as described herein.

Inventive Ethylene/α-Olefin/Diene Interpolymers

In one embodiment of the invention, the ethylene/α-olefin/nonconjugated diene interpolymer has a molecular weight distribution ($M_w/M_n$) from 3 to 8, more preferably from 3 to 7, and most preferably from 3 to 6, as determined by conventional GPC. All individual values and subranges from 3 to 8 are included herein and disclosed herein. In a preferred embodiment, the interpolymer is an ethylene/propylene/diene interpolymer, and further an EPDM terpolymer.

In one embodiment, the ethylene/α-olefin/nonconjugated diene interpolymer has a Mooney viscosity, ML(1+4) at 125° C., greater than 60, preferably greater than 70, more preferably greater than 80, even more preferably greater than 90, and most preferably greater than 100. In a preferred embodiment, the interpolymer is an ethylene/propylene/diene interpolymer, and further an EPDM terpolymer.

In one embodiment, the ethylene/α-olefin/nonconjugated diene interpolymer has a Mooney viscosity, ML(1+4) @ 125° C., less than 300, preferably less than, or equal to, 240, more preferably less than, or equal to, 200, and even more preferably less than, or equal to, 180. In a preferred embodiment, the interpolymer is an ethylene/propylene/diene interpolymer, and further an EPDM terpolymer.

As discussed above, Mooney viscosity is that of the neat interpolymer (or calculated viscosity of neat polymer for polymers that contain a filler, such as carbon black, and/or an oil). The neat polymer refers to the polymer without filler and without oil.

In one embodiment, the inventive interpolymers have a density of 0.856 to 0.885 g/cc (1 cc=1 cm³).

In one embodiment, each interpolymer is used in a dry form, without an oil extender. In another embodiment, each interpolymer is an EPDM interpolymer, which is used in a dry form, without an oil extender. In a further embodiment, the diene, is preferably 5-ethylidene-2-norbornene (ENB).

An inventive ethylene/α-olefin/nonconjugated diene interpolymer may comprise a combination of two or more embodiments as described herein.

Base Ethylene/α-Olefin/Nonconjugated Diene Interpolymer—Base Interpolymer

In general, polymerization of a base interpolymer may be accomplished at conditions well known in the art for Ziegler-Natta or Kaminsky-Sinn type polymerization reactions, that is, temperatures from 0° C. to 250° C., preferably 30° C. to 200° C., and pressures from atmospheric to 10,000 atmospheres. Polymerizations may also be conducted in accordance with processes disclosed in U.S. Pat. No. 6,680,361 (equivalent of International Publication No. WO 00/26268), fully incorporated herein by reference.

Polymerizations may be performed using a suspension, solution, slurry, or gas phase polymerization, or combinations thereof. In one embodiment, the polymerization is conducted in a solution loop reactor, or is conducted in a gas phase reactor. In another embodiment, a solution fed catalyst is used in a solution polymerization or in a gas phase polymerization. In another embodiment, the catalyst is supported on a support, such as, silica, alumina, or a polymer (especially poly (tetrafluoroethylene) or a polyolefin), and may be spray dried onto such supports, and introduced in supported form into a polymerization reactor.

The polymerization may take place in any suitable type of reactor, and preferably a reactor design that would allow one skilled in the art to determine catalyst efficiency. Reactors include, but are not limited to, batch reactors, continuous reactors, pilot plant reactors, a laboratory scale reactors, a high throughput polymerization reactors, and other types of commercial reactors.

Gas phase polymerizations are described in U.S. Pat. No. 5,264,506; U.S. Pat. No. 4,543,399; and European Patent EP 0089691B1; each is fully incorporated herein by reference. In one embodiment, the EAODM (preferably an EPDM) is polymerized in the gas phase in the presence of a partitioning agent (or filler). In a further embodiment, the partitioning agent is carbon black. In one embodiment, the interpolymer is in the form of granular particles.

Inert liquids are suitable solvents for polymerizations, such as solution polymerizations. Examples include straight-chain and branched-chain hydrocarbons, such as isobutane, butane, pentane, hexane, heptane, octane, and mixtures thereof; cyclic and alicyclic hydrocarbons, such as cyclohexane, cycloheptane, methylcyclohexane, methylcycloheptane, and mixtures thereof; perfluorinated hydrocarbons, such as perfluorinated C4-C10 alkanes; and aromatic and alkyl-substituted aromatic compounds, such as benzene, toluene, xylene, and ethylbenzene. Suitable solvents also include liquid olefins that may act as monomers or comonomers including butadiene, cyclopentene, 1-hexene, 4-vinyl-cyclohexene, 3-methyl-1-pentene, 4-methyl-1-pentene, 1,4-hexadiene, 1-octene, 1-decene, styrene, divinylbenzene, allylbenzene, and vinyltoluene (including all isomers alone or in admixture). Mixtures of the foregoing are also suitable. If desired, normally gaseous olefins can be converted to liquids by application of pressure, and used herein.

Suitable catalysts for use herein, preferably include constrained geometry catalysts, as disclosed in U.S. Pat. Nos. 5,272,236 and 5,278,272, which are both incorporated herein, in their entirety, by reference. The monocyclopentadienyl transition metal olefin polymerization catalysts taught in U.S. Pat. No. 5,026,798, the teachings of which are incorporated herein by reference, are also suitable as catalysts of the invention.

The foregoing catalysts may be further described as comprising a metal coordination complex, comprising a metal of groups 3-10 or the Lanthanide series of the Periodic Table of the Elements, and a delocalized 7E-bonded moiety, substituted with a constrain-inducing moiety, said complex having a constrained geometry about the metal atom, such that the angle at the metal between the centroid of the delocalized, substituted 7E-bonded moiety, and the center of at least one remaining substituent, is less than such angle in a similar complex, containing a similar 7E-bonded moiety lacking in such constrain-inducing substituent. In addition, for such complexes comprising more than one delocalized, substituted x-bonded moiety, only one thereof, for each metal atom of the complex, is a cyclic, delocalized, substituted 7r-bonded moiety. The catalyst further comprises an activating cocatalyst.

Preferred catalyst complexes correspond to the Structure I:

Structure I

In Structure I, M is a metal of group 3-10, or the Lanthanide series of the Periodic Table of the Elements;

Cp* is a cyclopentadienyl or substituted cyclopentadienyl group bound in an η5 bonding mode to M;

Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;

X independently each occurrence is an anionic ligand group or neutral Lewis base ligand group having up to 30 non-hydrogen atoms;

n is 0, 1, 2, 3, or 4 and is 2 less than the valence of M; and Y is an anionic or nonanionic ligand group bonded to Z and M comprising nitrogen, phosphorus, oxygen or sulfur and having up to 20 non-hydrogen atoms, optionally Y and Z together form a fused ring system. More specific complexes are described in U.S. Pat. Nos. 5,272,236 and 5,278,272, incorporated herein by reference.

Specific compounds include: (tert-butylamido) (tetramethyl-η5-cyclopentadienyl)-1,2-ethanediylzirconium dichloride, (tert-butylamido)(tetramethyl-η5-cyclopentadienyl) 1,2-ethanediyltitanium dichloride, (methylamido)(tetramethyl-η5-cyclopentadienyl)-1,2-ethanediylzirconium dichloride, (methylamido) (tetramethyl-η5 cyclopentadienyl)-1,2-ethanediyltitanium dichloride, (ethylamido)(tetramethyl-η5-cyclopentadienyl)-methylenetitanium dichloro, (tertbutylamido)dibenzyl(tetramethyl-η5-cyclopentadienyl) silanezirconium dibenzyl, (benzylamido)dimethyl(tetramethyl-η5-cyclopentadienyl)silanetitanium dichloride, (phenylphosphido) dimethyl(tetramethyl-η5-cyclopentadienyl)silanezirconium dibenzyl, (tertbutylamido) dimethyl(tetramethyl-η5-cyclopentadienyl) silanetitanium dimethyl, and the like.

In addition to constrained geometry catalysts, additional single site catalyst systems that are suitable for use herein include metallocene catalyst systems and post metallocene catalyst systems.

In one embodiment, the ethylene/α-olefin/nonconjugated diene interpolymers suitable interpolymers for use in the invention are homogeneously branched linear (short chain branches) or homogeneously branched substantially linear interpolymers. In a further embodiment, the ethylene/α-olefin/nonconjugated diene interpolymers are homogeneously branched linear interpolymers. In another embodiment, the ethylene/α-olefin/nonconjugated diene interpolymers are homogeneously branched substantially linear interpolymers.

Examples of suitable interpolymers for use in the invention include NORDEL hydrocarbon rubbers available from The Dow Chemical Company.

The terms "homogeneous" and "homogeneously-branched" are used in reference to an ethylene/α-olefin polymer (or interpolymer), in which the comonomer(s) is/are randomly distributed within a given polymer molecule, and all of the polymer molecules have the same or substantially the same comonomer(s)-to-ethylene ratio. The homogeneously branched ethylene interpolymers include linear ethylene interpolymers, and substantially linear ethylene interpolymers.

Included amongst the homogeneously branched linear ethylene interpolymers are ethylene interpolymers, which lack long chain branching (or measurable amounts of long chain branching), but do have short chain branches, derived from the comonomer(s) polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, made using uniform branching distribution polymerization processes, as described, for example, by Elston in U.S. Pat. No. 3,645,992.

Long chain branching can be determined by using 13C Nuclear Magnetic Resonance (NMR) spectroscopy, and can be quantified using the method of Randall (Rev. Macromol. Chem. Phys., C29 (2 & 3), 1989, p. 285-297), the disclosure of which is incorporated herein by reference. Two other methods are gel permeation chromatography, couple with a low angle laser light scattering detector (GPCLALLS), and gel permeation chromatography, coupled with a differential viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949) and Rudin, A., Modern Methods of Polymer Characterization, John Wiley & Sons, New York (1991) pp. 103-112.

Substantially linear ethylene interpolymers are described in U.S. Pat. Nos. 5,272,236 and 5,278,272; the entire contents of each are herein incorporated by reference. As discussed above, the substantially linear ethylene interpolymer is that in which the comonomer(s) is/are randomly distributed within a given interpolymer molecule, and all of the interpolymer molecules have the same or substantially the same comonomer(s) to ethylene ratio. Substantially linear ethylene interpolymers are prepared using a constrained geometry catalyst.

In U.S. Pat. No. 5,278,272, it was discovered that constrained geometry catalysts (CGC) have the ability to incorporate vinyl terminated macromonomers into the polymer backbone to form long chain branched (LCB) polymers. Such branching is referred to as T type branching. The amount of LCB that can be incorporated by these CGC is typically from 0.01 LCB/1000 carbon atoms to 3 LCB/1000 carbon atoms (both backbone and branched carbon atoms). The long chain branches have about the same comonomer distribution as the polymer backbone, and can have about the same length as the length of the polymer backbone. The carbon length of a long chain branch is longer than the carbon length of a short chain branch formed from the incorporation of one comonomer into the polymer backbone.

In one embodiment of the invention, the base ethylene/α-olefin/nonconjugated diene interpolymer has a molecular weight distribution ($M_w/M_n$) from 1.1 to 3, more preferably from 1.2 to 2.9 and most preferably from 1.5 to 2.8, as determined by conventional GPC. All individual values and subranges from 1.1 to 3 are included herein and disclosed herein. In a preferred embodiment, the interpolymer is an ethylene/propylene/diene interpolymer, and further an EPDM terpolymer.

In one embodiment, the base ethylene/α-olefin/nonconjugated diene interpolymer has a Mooney viscosity, ML(1+4) at 125° C., greater than 45, preferably greater than 50, more preferably greater than 55, even more preferably greater than 60, and most preferably greater than 65. In a preferred embodiment, the interpolymer is an ethylene/propylene/diene interpolymer, and further an EPDM terpolymer.

In one embodiment, the base ethylene/α-olefin/nonconjugated diene interpolymer has a Mooney viscosity, ML(1+4) @ 125° C., less than 100, preferably less than, or equal to, 90, more preferably less than, or equal to, 80. In a preferred embodiment, the interpolymer is an ethylene/propylene/diene interpolymer, and further an EPDM terpolymer.

As discussed above, Mooney viscosity is that of the neat interpolymer (or calculated viscosity of neat polymer for polymers that contain a filler, such as carbon black, and/or an oil). The neat polymer refers to the polymer without filler and without oil.

In another embodiment, the ethylene/α-olefin/nonconjugated diene interpolymer has a weight average molecular weight, ($M_w$) from 100,000 g/mole to 400,000 g/mole, more preferably from 120,000 g/mole to 300,000 g/mole, and most preferably from 150,000 g/mole to 250,000 g/mole. All individual values and subranges from 100,000 g/mole to 400,000 g/mole are included herein and disclosed herein. In a preferred embodiment, the interpolymer is an ethylene/propylene/diene interpolymer, and further an EPDM.

An ethylene/α-olefin/nonconjugated diene interpolymer (based polymer) may comprise a combination of two or more embodiments as described herein.

Azides

Suitable azides include, but are not limited to, the polyfunctional sulfonyl azides as disclosed in U.S. Pat. No. 6,521,306, incorporated herein by reference. The poly(sulfonyl azide) is any compound having at least two sulfonyl azide groups ($-SO_2N_3$) reactive with the polyolefin. Preferably the poly(sulfonyl azide)s have a structure X—R—X wherein each X is $SO_2N_3$, and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the polyolefin and the sulfonyl azide.

Preferred poly(sulfonyl azide)s include oxy-bis(4-sulfonylazidobenzene), 2,7-naphthalene bis(sulfonyl azido), 4,4'-bis (sulfonyl azido)biphenyl, 4,4'-diphenyl ether bis(sulfonyl azide) (also known as 4,4'-diphenyl oxide bis(sulfonyl azido)) and bis(4-sulfonyl azidophenyl)methane, and mixtures thereof. Most preferred is 4,4'-diphenyl oxide bis(sulfonyl azido) (also designated DPO-BSA herein).

Peroxides

Suitable peroxides include, but are not limited to, benzoyl peroxide, lauroyl peroxide, dicumyl peroxide, di-t-butyl peroxide, di-t-amyl peroxide, t-butyl peroxybenzoate, t-amyl peroxybenzoate, 1,1-bis(t-butylperoxy)-3,3,5-trimethylcyclohexane, α,α'-bis(t-butylperoxy)-1,3-diisopropylbenzene, α,α'-Bis(t-butylperoxy)-1,4-diisopropylbenzene, 2,5-bis(t-butylperoxy)-2,5-dimethylhexane, 2,5-bis(t-butylperoxy)-2, 5-dimethyl-3-hexyne, didecanoyl peroxide, diacetyl peroxide and di(3,5,5-trimethylhexanoyl)peroxide. Preferred peroxides include α,α'-bis(t-butylperoxy)-1,3-diisopropylbenzene, and α,α'-Bis(t-butylperoxy)-1,4-diisopropylbenzene.

Additives

An inventive composition may comprise one or more additives. Suitable additives include, but are not limited to, fillers, antioxidants, UV stabilizers, vulcanizing agents, foaming agents, flame retardants, colorants or pigments, and combinations thereof.

In one embodiment, the composition further comprises at least one additive selected from fillers, crosslinking agents, foaming agents, or combinations thereof.

In one embodiment, the composition further comprises at least one additive selected from silica; clay; titanium dioxide; silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; or combinations thereof.

Fillers for use as an additive in the invention include carbon black; silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; phenol-formaldehyde, polystyrene, and poly(alphamethyl)-styrene resins, natural fibers, synthetic fibers, and the like.

Plasticizers employed as additives in the invention include petroleum oils, such as ASTM D2226 aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; vegetable oils, such as castor, tall, rapeseed, and soybean oils and esters and epoxidized derivatives thereof; and the like.

Antioxidants and antiozonants additives for use in the invention include hindered phenols, bisphenols, and thiobisphenols; substituted hydroquinones; tris(alkylphenyl) phosphites; dialkylthiodipropionates; phenylnaphthylamines; substituted diphenylamines; dialkyl, alkyl aryl, and diaryl substituted p-phenylene diamines; monomeric and polymeric dihydroquinolines; 2-(4-hydroxy-3,5-t-butylaniline)-4,6-bis(octylthio)1,3,5-triazine, hexahydro-1,3,5-tris-β-(3,5-di-t-butyl-4-hydroxyphenyl)propionyl-s-triazine, 2,4,6-tris(n-1,4-dimethylpentylphenylene-diamino)-1,3,5-triazine, tris-(3,5-di-t-butyl-4-hydroxybenzyl)isocyanurate, nickel dibutyldithiocarbamate, 2-mercaptotolylimidazole and its zinc salt, petroleum waxes, and the like.

Foaming agents useful in making the resulting foam structure include, but are not limited to, decomposable chemical foaming agents. Such chemical foaming agents decompose at elevated temperatures to form gases or vapors to blow the polymer into foam form. The agent preferably takes a solid form, so it is conveniently dry-blended with the polymer material. Chemical blowing agents include, but are not limited to, azodicarbonamide, azodiisobutyro-nitrile, barium azodicarboxylate, N,N'-dimethyl-N,N'-dinitrosoterephthalamide, N,N'-dinitrosopentamethylenetetramine, benzenesulfonhydrazide, 4,4-oxybenzene sulfonyl semicarbazide, p-toluene sulfonyl semicarbazide, p,p'-oxybis-(benzenesulfonyl hydrazide), 3,3'-disulfonhydrazide-diphenylsulfone, azobisisobutyronitrile, azobisformamide and the like. In one embodiment, the blowing agent is azodicarbonamide. These foaming agents may be used alone or in admixture of two or more. In one embodiment, the foaming agent is an inorganic foaming agent, such as ammonium carbonate, sodium bicarbonate, anhydrous sodium nitrate and the like. Additional teachings related to chemical foaming agents are seen in C. P. Park, Supra, pp. 205-208, and F. A. Shutov, "Polyolefin Foam", Handbook of Polymer Foams and Technology, pp. 382-402, D. Klemper and K. C. Frisch, Hanser Publishers, Munich, Vienna, New York, Barcelona (1991), which is incorporated herein by reference.

In one embodiment, the chemical foaming agent is blended with the polymer material in an amount sufficient to evolve advantageously about 0.2 to about 5.0, preferably from about 0.5 to about 3.0, and most preferably from about 1.0 to 2.50 moles of gas or vapor per kilogram of polymer.

Vulcanizing agents for use in the invention include, but are not limited to, sulfur-containing compounds, such as elemental sulfur, 4,4'-dithiodimorpholine, thiuram di- and polysulfides, alkylphenol disulfides, and 2-morpholino-dithiobenzothiazole; peroxides, such as di-tertbutyl peroxide, tertbutylcumyl peroxide, dicumyl peroxide, 2,5-dimethyl-2, 5-di-(tertbutylperoxy) hexane, di-(tertbutylperoxyisopropyl) benzene, tertbutyl peroxybenzoate and 1,1-di-(tertbutylperoxy)-3,3,5-trimethylcyclohexane; metal oxides, such as zinc, magnesium, and lead oxides; dinitroso compounds, such as p-quinone-dioxime and p,p'-dibenzoylquinone-dioxime; and phenol-formaldehyde resins containing hydroxymethyl or halomethyl functional groups. The suitability of any of these vulcanizing agents for use in the invention will be largely governed by the choice of polymers, as is well known to those skilled in the compounding art.

In one embodiment of the invention, the sulfur containing compounds and the peroxides are the preferred vulcanizing agents, and the sulfur containing compounds are most preferred. It is understood that mixtures of these vulcanizing agents can be employed, though this is generally not preferred. The amount of the vulcanizing agent can range from about 1 to 10 parts by weight, based upon 100 parts of the polymers in the composition.

Sulfur can be a crystalline elemental sulfur or an amorphous elemental sulfur, and either type can be in pure form or supported on an inert carrier. An example of a supported sulfur is Rhenogran S-80 (80% S and 20% inert carrier) from Rhein Chemie.

Vulcanization temperatures and time employed are typical. Temperatures ranging from about 250° F. to about 440° F., and times ranging from about one minute to about 120 minutes can be employed.

In one embodiment, the composition contains a flame retardant, for example a metal hydrate, such as aluminum trihydroxide, magnesium dihydroxide, or combinations thereof.

Additional additives include other polymers, including, but not limited to, ethylene-base polymers, and olefin multi-block interpolymers.

Suitable ethylene-base polymers include, but are not limited to, high density polyethylene (HDPE), linear low density polyethylene (LLDPE), very low density polyethylene (VLDPE), ultra low density polyethylene (ULDPE), homogeneously branched linear ethylene polymers, and homogeneously branched substantially linear ethylene polymers (that is homogeneously branched long chain branched ethylene polymers).

Some commercial examples of suitable ethylene-base interpolymers include commercially available HDPE, commercially available LDPE, ATTANE, AFFINITY, DOWLEX, FLEXOMER, ELITE, all available from The Dow Chemical Company; and EXCEED and EXACT available from Exxon Chemical Company.

The olefin multi-block interpolymers and their preparation and use, are described in WO 2005/090427, U.S. 2006/0199931, U.S. 2006/0199930, U.S. 2006/0199914, U.S. 2006/0199912, U.S. 2006/0199911, U.S. 2006/0199910, U.S. 2006/0199908, U.S. 2006/0199907, U.S. 2006/0199906, U.S. 2006/0199905, U.S. 2006/0199897, U.S. 2006/0199896, U.S. 2006/0199887, U.S. 2006/0199884, U.S. 2006/0199872, U.S. 2006/0199744, U.S. 2006/0199030, U.S. 2006/0199006 and U.S. 2006/0199983; each publication is fully incorporated herein by reference.

Applications

The compositions of the present invention may be used to prepare any of a variety of articles or manufacture, or their component parts or portions. The inventive compositions may be converted into a finished article of manufacture by any one of a number of conventional processes and apparatus. Illustrative processes include, but are not limited to, extrusion, calendering, injection molding, compression molding, and other typical thermoplastic processes. For example, articles can be prepared by injection molding, extrusion, extrusion followed by either male or female thermoforming, low pressure molding, compression molding, and the like.

Articles include, but are not limited to, foams, sponges, belts, hoses, tubes, gaskets, membranes, molded goods, extruded parts, and adhesives. Additional articles includes polymer sheets, fibers coatings, automotive parts (for example, tires and tire components), computer parts, building materials, household appliances, electrical supply housings, trash cans, storage or packaging containers, lawn furniture strips or webbing, lawn mower, garden hose, and other garden appliance parts, refrigerator gaskets, acoustic systems, utility cart parts, desk edging, toys and water craft parts. The compositions can also be used in roofing applications, such as roofing membranes. The compositions can further be used in fabricating a footwear component, including, but not limited to, a shaft for a boot, particularly an industrial work boot. A skilled artisan can readily augment this list without undue experimentation.

In one embodiment, the invention provides a foam formed from an inventive composition. In a further embodiment, the foam has a water absorption less than 3.5 percent, based on the weight of the sample. In a further embodiment, the foam has a Compression set less than 50 percent, as determined according to ASTM D1056 (Sec 49-55). The sample was pressed to 50% of the original thickness with a fixture at 100° C. for 22 hours, after which the compression was released. The thickness of the specimen was measured after 30 minutes. In yet another embodiment, the foam has a density from 0.4 to 0.6 g/cc (ASTM 792, 1 cc=1 cm$^3$). An inventive foam may have a combination of two or more embodiments as described herein.

In one embodiment, the invention provides an article comprising at least one component formed from an inventive composition. In a further embodiment, the article is in an automotive part. In another embodiment, the article is a building or construction material.

DEFINITIONS

The term "composition," as used herein, includes a mixture of materials, which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer, employed to refer to polymers prepared from only one type of monomer, and the term interpolymer as defined hereinafter.

The term "interpolymer," as used herein, refers to polymers prepared by the polymerization of at least two different types of monomers. The generic term interpolymer thus includes copolymers, employed to refer to polymers prepared from two different types of monomers, and polymers prepared from more than two different types of monomers.

The terms "blend" or "polymer blend," as used herein, mean a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "parts," in reference to an amount of a component, refers to the weight parts of a component in a composition.

The term "granular particles," as used herein, refer to polymer particles in a friable form. This term does not refer to polymer in a bale form.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Mooney Viscosity

Interpolymer MV (ML1+4 at 100° C.) is measured in accordance with ASTM 1646-04, with a one minute preheat time and a four minute rotor operation time. The instrument is an Alpha Technologies Rheometer MDR 2000.

Interpolymer MV (ML1+4 at 125° C.) is measured in accordance with ASTM 1646-04, with a one minute preheat time and a four minute rotor operation time. The instrument is an Alpha Technologies Rheometer MDR 2000.

For a carbon black filled EAODM (preferably an EPDM) interpolymer, the Mooney Viscosity [MV (ML1+4 at 125° C.)] for the neat interpolymer (no filler (for example, carbon black) and no oil) can be determined, by one skilled in the art, by one of two methods as described below. The following methods are in reference to carbon black filled interpolymers, however, one skilled in the art could use similar methods for other types of fillers. The following methods can also be modified by one skilled in the art to provide for the determination of Mooney viscosities at other temperatures and/or other test conditions, such as preheat time and/or rotor size.

Method 1

For a carbon black filled interpolymer (INTA), preferably with no oil, or a known amount of oil (typically less than two weight percent, based on weight of interpolymer), and which has a measured viscosity less than 100 [MV (ML1+4 at 125° C.)], the Mooney viscosity of the neat interpolymer is determined from a calibration curve as follows. The amount of carbon black in the polymerized INT A interpolymer can be determined gravimetrically, for example, by selective ashing of the polymer (plus additives if present), and, if present, oil, in a manner to leave the carbon black intact (for example TGA).

A neat interpolymer, corresponding in chemical make-up to the interpolymer of interest, and prepared from the same or similar catalyst system, and of known Mooney viscosity [MV (ML1+4 at 125° C.)], is melt blended with various levels of carbon black, and, if needed, the required amount of oil, to form a range of carbon black filled interpolymers. Melt blending can be done in a Brabender mixer. The carbon black and oil used, are the same as that in the interpolymer of interest (INT A). The Mooney viscosity [MV (ML1+4 at 125° C.)] is measured for each sample, and a calibration curve is generated, showing the measured Mooney viscosity as a function of the amount of carbon black. A series of such calibration curves are generated for several neat interpolymers (no filler, no oil) of varying viscosities. The data from the generated calibration curves is entered into a regression program, such as a MICROSOFT EXCEL regression program, and the following information is generated: a coefficient for the carbon black level, a coefficient for the measured Mooney viscosity, and an intercept.

The Mooney viscosity [MV (ML1+4 at 125° C.)] of the neat interpolymer of interest can be calculated using the data generated from the regression analysis, the known level of carbon black in the interpolymer (INTA), and the measured Mooney viscosity [MV (ML1+4 at 125° C.)] of the interpolymer (INT A).

Method 2

For a carbon black filled interpolymer (INT B), preferably with no oil, or a known amount of oil (typically less than two weight percent, based on the weight of the interpolymer) that has a viscosity that is determined to be greater than, or equal to, 100 [MV (ML1+4 at 125° C.)], the Mooney viscosity of the neat polymer is determined from a calibration curve as follows. The amount of carbon black in the polymerized INT B interpolymer can be determined gravimetrically, for example, by selective ashing of the polymer (plus additives if present), and, if present, oil, in a manner to leave the carbon black intact (for example TGA).

A neat interpolymer, corresponding in chemical make-up to the interpolymer of interest, and prepared from the same or similar catalyst system, and of known polymer Mooney viscosity, is melt blended, with a fixed amount of carbon black (for example, from 40 to 60 phr carbon black, based on hundred parts interpolymer), and a fixed amount of an oil (for example, from 60 to 80 phr oil, based on hundred parts interpolymer), to form a first sample. The carbon black and oil used, are the same as that in the interpolymer of interest (INTB). Additional samples are formed, each having an interpolymer of different Mooney viscosity, and each having the same amount of both carbon black and oil. The Mooney viscosity [MV (ML1+4 at 125° C.)] is measured for each sample. A calibration curve is generated, showing the measured Mooney viscosity [MV (ML1+4 at 125° C.)] as a function of the Mooney viscosity [MV (ML1+4 at 125° C.)] of the neat interpolymer (no filler, no oil).

The carbon-black filled interpolymer (INT B) of interest is next compounded with additional carbon black to achieve a final carbon black level as that used in the samples for calibration, as discussed above. Also the INT B interpolymer is compounded with the same oil, and at the same oil level, as that used in the samples for calibration as discussed above, to form a "new compounded INT B" interpolymer. The Mooney viscosity [MV (ML1+4 at 125° C.)] of the new compounded INT B interpolymer is measured. The Mooney viscosity of the neat interpolymer can be then calculated using the calibration curve as described above.

Polymer density is measured in accordance with ASTM D-792-00.

Gel Permeation Chromatography (GPC)

Polymer molecular weight was characterized by high temperature triple detector gel permeation chromatography (3D-GPC). The chromatographic system consisted of a Polymer Laboratories (Amherst, Mass., now part of Varian, Inc, Shropshire, UK) "PL-GPC 210" high temperature chromatograph, equipped with a concentration detector (RI), a Precision Detectors (Amherst, Mass.) 2-angle laser light scattering detector, Model 2040, and a 4-capillary differential viscometer detector, Model 220, from Viscotek (Houston, Tex.). The 15° angle of the light scattering detector was used for calculation purposes.

Data collection was performed using Viscotek TriSEC software version 3 and a 4-channel Viscotek Data Manager DM400. The system was equipped with an on-line ERC-3415a four channel degasser system from ERC Inc (Tokyo, JP). The carousel compartment was operated at 150° C. for polyethylene and 85° C. for EPDM, and the column compartment was operated at 150° C. The columns were four Polymer Lab Mix-A 30 cm, 20 micron columns. The polymer solutions are prepared 1,2,4-trichlorobenzene (TCB). The samples were prepared at a concentration of 0.1 grams of polymer in 50 ml of TCB. The chromatographic solvent and the sample preparation solvent contained 200 ppm of butylated hydroxytoluene (BHT). Both solvent sources were nitrogen purged. Polyethylene samples were stirred gently at 160° C. for 4 hours. EPDM samples were stirred gently at 160° C. for one hour. For carbon black containing samples, carbon black was removed by a one-time filtration that was performed at 150° C., under nitrogen pressurized flow through a pre-heated layer of Perlite in a ceramic filter. The injection volume was 200 µl, and the flow rate was 1.0 ml/minute.

Calibration of the GPC column set was performed with 21 narrow molecular weight distribution polystyrene standards. The molecular weights of the standards ranged from 580 to 8,400,000, and were arranged in 6 "cocktail" mixtures, with at least a decade of separation between individual molecular weights.

The polystyrene standard peak molecular weights were converted to polyethylene molecular weights using the following equation (as described in Williams and Ward, J. Polym. Sci., Polym. Let., 6, 621 (1968)):

$$M\text{polyethylene} = A \times (M\text{polystyrene})^B \quad (1A),$$

where M is the molecular weight, A has a value of 0.39 and B is equal to 1.0.

A fourth order polynomial was used to fit the respective polyethylene-equivalent calibration points.

The total plate count of the GPC column set was performed with Eicosane (prepared at 0.04 g in 50 milliliters of TCB, and dissolved for 20 minutes with gentle agitation.) The plate count and symmetry were measured on a 200 microliter injection according to the following equations:

$$\text{PlateCount} = 5.54 \cdot (\text{RV at Peak Maximum}/(\text{Peak width at } \frac{1}{2} \text{ height}))^2 \quad (2A),$$

where RV is the retention volume in milliliters, and the peak width is in milliliters.

$$\text{Symmetry} = (\text{Rear peak width at one tenth height} - \text{RV at Peak maximum})/(\text{RV at Peak Maximum} - \text{Front peak width at one tenth height}) \quad (3A),$$

where RV is the retention volume in milliliters, and the peak width is in milliliters.

The Systematic Approach for the determination of multi-detector offsets was done in a manner consistent with that published by Balke, Mourey, et. Al (Mourey and Balke, Chromatography Polym. Chpt 12, (1992)) (Balke, Thitiratsakul, Lew, Cheung, Mourey, Chromatography Polym. Chpt 13, (1992)). Optimizing dual detector log molecular weight results from a broad polyethylene of 115,000 to the narrow standard column calibration results from the narrow standards calibration curve using in-house software. The molecular weight data for off-set determination was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration, used for the determination of the molecular weight, was obtained from the sample refractive index increment area, and the RI detector calibration from a linear polyethylene homopolymer of 115,000 Dalton molecular weight. The refractive index increment (dn/dc) for polyethylene is −0.104 mL/g and dn/dc for EODM is −0.094 mL/g. The chromatographic concentrations were assumed low enough to eliminate addressing 2nd Virial coefficient effects (concentration effects on molecular weight).

The calculations of Mn, Mw, and Mz based on GPC (conventional GPC for Mn, Mw and Mz) results using the RI detector were determined from the following equations:

$$\overline{Mn} = \frac{\sum_i RI_i}{\sum_i (RI_i / M_{calibration_i})} \quad (4A)$$

$$\overline{Mw} = \frac{\sum_i (RI_i * M_{cal_i})}{\sum_i RI_i} \quad (5A)$$

$$\overline{Mz} = \frac{\sum_i (RI_i * M_{cal_i}^2)}{\sum_i (RI_i * M_{cal_i})} \quad (6A)$$

The weight percent of polymer fraction with molecular weight $>10^6$ g/mole was calculated by determining the area fraction under the molecular weight distribution curve $>10^6$ g/mole. The molecular weight distribution curve was obtained from Conventional GPC measurements and equation (1A) above (where the total area of the molecular weight distribution curve is defined as 1).

In addition to the above calculations, a set of alternative values [Mw(abs), Mz(abs), Mz (BB) and $M_{z+1}$ (BB)] values were also calculated with the method proposed by Yau and Gillespie, Polymer, 42, 8947-8958 (2001), and determined from the following equations:

$$\overline{Mw}(\text{abs}) = K_{LS} * \frac{\sum_i (LS_i)}{\sum_i (IR_i)}, \quad (8A)$$

where, $K_{LS}$=LS-MW calibration constant.

$$\overline{Mz}(\text{abs}) = \frac{\sum_i RI_i (LS_i / RI_i)^2}{\sum RI_i * (LS_i / RI_i)}, \quad (9A)$$

$$\overline{Mz}(BB) = \frac{\sum_i (LS_i * Mcalibration_i)}{\sum_i (LS_i)}, \quad (10A)$$

$$\overline{M}_{z+1}(BB) = \frac{\sum_i (LS_i * Mcalibration_i^2)}{\sum (LS_i * Mcalibration_i)}, \quad (11A)$$

where LS, is the 15 degree LS signal, and the Mcalibration uses equation 1A, and the LS detector alignment is as described previously.

In order to monitor the deviations over time, which may contain an elution component (caused by chromatographic changes) and a flow rate component (caused by pump changes), a late eluting narrow peak is generally used as a "flow rate marker peak." A flow rate marker was therefore established based on the air peak in TCB or a drop of decane flow marker dissolved in the eluting sample prepared in TCB. Flow rate marker was used to linearly correct the flow rate for all samples by alignment of the air peaks or decane peaks. Any changes in the time of the marker peak are then assumed to be related to a linear shift in both flow rate and chromatographic slope.

The preferred column set is of 20 micron particle size and "mixed" porosity to adequately separate the highest molecular weight fractions appropriate to the claims.

The plate count for the chromatographic system (based on eicosane as discussed previously) should be greater than 22,000, and symmetry should be between 1.00 and 1.12.

Method for Determination of Non-Conjugated Polyenes in an Ethylene/α-Olefin/Polyene Interpolymer by NMR The ethylene and non-conjugated polyene (or diene) contents of an interpolymer comprising ethylene, an α-olefin and a non-conjugated polyene (or diene) can be determined by 13C or 1H Nuclear Magnetic Resonance (NMR) spectroscopy. For example, the 1H NMR spectra can be obtained via a Varian XL-400 NMR spectrometer, operating in Fourier Transform mode, with the following instrument conditions: pulse angle, 40°; acquisition time, 0.7 sec; pulse delay, 5.0 sec; spectral width, 12,000 Hz, and number of transient accumulated, 200. Samples are dissolved in deuterated chloroform, at room temperature, at a concentration of 1-2 weight percent, based on the total weight of the solution.

For the determination of the ethylene content, the integrals of the methyl region (chemical shift delta versus tetramethysilane=0.88 ppm to 0.94 ppm) and the methylene region and methine region (delta=1.10 ppm to 1.54 ppm) can be employed. Similarly, if the α-olefin is propylene, the propylene content can also be determined from the resolved methyl spectral peak. The non-conjugated polyene content can be determined from the integral of the peak for the olefinic protons occurring at around 5 ppm, and the methylene, methyl and methine regions are corrected for the presence of the non-conjugated polyene units incorporated in the polymer. For example, when the diene is ENB, the diene content is determined from the integral of the peak for olefinic protons occurring at about 5.28 and 5.02 ppm (for cis- and trans-methine protons of =CH—CH3, respectively), and the methylene, methyl and methine regions are corrected for the presence of incorporated ENB. If the non-conjugated polyene is another kind, characteristic NMR spectral shift(s) can be resolved, and the integral of the chemical shift regions can be obtained. In addition, unincorporated non-conjugated polyene, if present, can be distinguished by the presence of vinyl protons. In this way, the proton analysis is capable of yielding unambiguous values for the contents of ethylene, α-olefin, such as propylene, and diene incorporated in the polymer.

Similarly, the content of the non-conjugated polyene an interpolymer comprising ethylene, an α-olefin and a non-conjugated polyene can also be determined using 13C NMR and other spectroscopic methods.

Additional spectroscopic methods are described in the following references, each fully incorporated herein by reference.
1. Yasuyuki Tanaka, Hisaya Sato, Yukio Ozeki, Masaru Ikeyama and Takefumi Sato, "Determination of unsaturation in ethylene-propylene terpolymers and butyl rubber by time-averaged 1H n.m.r. measurements", Polymer, 16(10) (1975), 709-713.
2. U.S. Pat. No. 5,229,478, "Process for production of high molecular weight EPDM elastomers using a metallocene-alumoxane catalyst system", Jul. 20, 1993 (http://www.freepatentsonline.com/5229478.html).
3. W. Heinena, L. N. Ballijnsa, W. J. A. Wittenburga, R. Wintersa, J. Lugtenburga, M. van Duinb, "Synthesis and characterization of carbon-13 labelled 2-ethylidene-5-norbornene containing EPDM rubber. Observation of crosslinking and oxidation", Polymer 40 (1999) 4353-4363.
4. Harry J. A. Philipsen, "Determination of chemical composition distributions in synthetic polymers", Journal of Chromatography A, 1037 (2004) 329-350.
5. S. DiMartino and M. Kelchtermans, Determination of the composition of ethylene-propylene-rubbers using 13C-NMR spectroscopy, J. Appl. Poly. Sci. 56(13) (2003) 1781-1787.
6. Hayashi, T., Inoue, Y., Chujo, R., "Ethylene-Propylene Copolymerization Mechanism Based on the Sequence Distributions Determined by 13C NMR Spectra", Macromolecules 21 (1988) 3139-3146.

Method for Determination of Weight Percentage of ENB in an Ethylene/Propylene/ENB (EPDM) Terpolymer using FTIR The weight percentage of 5-ethylidenenorbornene (ENB) can be determined using a Fourier Transform Infrared Spectroscopic (FTIR) method (for example, ASTM D65047-99). According to this ASTM D65047-99 method, the ENB content is determined from its infrared absorbance at 1681-1690 cm$^{-1}$, a measure of the ENB's exocyclic double bond. For EPDM catalyzed with a single site catalyst, the infrared absorbance band at about 1688 cm$^{-1}$ can be used. The absorbance of the EPDM interpolymer at 1688 cm$^{-1}$ is related to ENB mass fraction, and the mass fraction is determined by calibrating the instrument with known EPDM standards. The presence of oil and other components are first removed, such as by extraction, before the FTIR analysis. For oil-extended polymers, the oil can be removed using ASTM Method D 1416, section 67 through 74 and ASTM Method D 297.

The FTIR spectra were collected with 32 scans, at a resolution of 2 cm$^{-1}$. The spectra for the dry empty specimen compartment (Po) were first collected. The test sample was placed in the specimen compartment, and the dry atmosphere was re-established inside the specimen compartment. The single beam spectra (P) were collected, and the specimen absorbance (A) was calculated according to the following equation: $A=-\log 10(P/Po)$.

The calibration may be made using known standards covering the desired weight percent diene range, typically from 0 to 10 weight percent. The calibration may be based on primary standards for which the weight percent of ENB may be established via the use of primary methods, such as Nuclear Magnetic Resonance (NMR) methods.

The FTIR test specimen are prepared by pressing 0.20+/−0.05 grams of the polymer sample, placed between two MYLAR sheets, using a platen press, heated at 125° C.+/−5° C., and a 4 MPa pressure, for 60+/−10 seconds. The pressed sheet is cooled to ambient temperature. A piece of the pressed film is cut into "15 mm by 50 mm" sized sample, and placed into the FTIR spectrophotometer sample holder window for spectral acquisition.

Additional spectroscopic methods are described in the following references, each fully incorporated herein by reference.
1. ASTM D 6047-99, "Standard Test Methods for Rubber, Raw—Determination of 5-Ethylidenenorbornene (ENB) or Dicyclopentadiene (DCPD) in Ethylene-Propylene-Diene (EPDM) Terpolymers", Annual Book of ASTM Standards, 1999 Issue.
2. J. M. Winter, M. S. Edmondson, D. R. Parikh, D. J. Mangold, and M. J. Castille, Jr. "Thermal and Spectroscopic (Vibrational and Nuclear Magnetic Resonance) Characterization of Ethylene-Propylene-Diene (EPDM) Elastomers", Presented at 152nd Fall Technical Meeting, Rubber Division, American Chemical Society, Cleveland, Ohio, Oct. 21-24, 1997. Paper No. 40.
3. S. DiMartino and M. Kelchtermans, Determination of the composition of ethylene-propylene-rubbers using 13C-NMR spectroscopy, J. Appl. Poly. Sci. 2003, 56 (13), 1781-1787.
4. Hayashi, T., Inoue, Y., Chujo, R., "Ethylene-Propylene Copolymerization Mechanism Based on the Sequence Distributions Determined by 13C NMR Spectra", Macromolecules 1988, 21, 3139-3146.
5. Ray, G. J., Johnson, P. E., Knox, J. R., "Carbon-13 Nuclear Magnetic Resonance Determination of Monomer Composition and Sequence Distributions in Ethylene-Propylene Copolymers Prepared with a Stereoregular Catalyst System', Macromolecules 1977, 10, 773-778.

MDR @ 180° C. were measured in accordance with ASTM D5289-95, using a RHEOLINE MDR, in conjunction with an HP Desktop Computer. The data was analyzed using LABLINE 2001 software (available from Prescott Instruments Ltd.). Sample size about 5-10 grams (uncured sample). Machine parameters: oscillating frequency of 1.67 Hz, oscillation amplitude of 0.5°, and machine temperature range 25° C.-250° C. Test run at 180° C., according to the ASTM procedure. The t10, t90 and t95 (time for the sample to reach 10%, 90% or 95%, respectively, cured state, as reflected in reaching 10%, 90% or 95%, respectively, of the maximum torque value) were measured in accordance with ASTM D5289-95.

MDR @ 160° C. was measured in accordance with the above test method for "MDR @ 180 C." Test run at 160° C., according to the ASTM procedure.

MDR @ 200° C. was measured in accordance with the above test method for "MDR @ 180 C." Test run at 200° C., according to the ASTM procedure.

The Mooney Scorch (125° C.) was measured in accordance with ASTM D1646-04, using a MOONEYLINE Viscometer, in conjunction with an HP Desktop Computer. The data was analyzed using LABLINE 2001 software. Sample size about 16 grams (uncured sample). Machine parameters: rotation speed of 2 RPM, and temperature range from room temp to 250° C. Test run at 125° C., according to the ASTM procedure. The t5 (time for sample to raise 5 Mooney Units above the minimum viscosity at 125° C., measured after the preheat) and t30 (time for sample to raise 30 Mooney Units above the minimum viscosity at 125° C., measured after the preheat) were measured in accordance with ASTM D1646-04.

Gel Content

In order to detect the presence of, and where desirable, quantify insoluble gels in a polymer composition, such as the rheology-modified compositions of this invention, simply soak the composition in a suitable solvent such as refluxing xylene for 12 hours, as described in ASTM D 2765-90, method B. Any insoluble portion of the composition is then isolated, dried and weighed, making suitable corrections based upon knowledge of the composition. For example, the weight of non-polymeric components that are soluble in the solvent is subtracted from the initial weight, and the weight of non-polymeric components that are insoluble in the solvent is subtracted from both the initial and final weight. The insoluble polymer recovered is reported as percent gel content, based on the weight of the polymer. For purposes of this invention, "substantially gel-free" means a percent gel content that is desirably less than about 10 wt %, more desirably less than about 8 wt %, preferably less than about 5 wt %, more preferably less than about 3 wt %, still more preferably less than about 2 wt %, even more preferably less than about 1 wt % and most preferably below detectable limits when using xylene as the solvent.

Water Absorption

The water absorption of the foam article was measured by submersing the foam article of approximately ¾" in length and about ⅓" in diameter, in deionized water, under vacuum, for three minutes after reaching a vacuum of 25 inches of Hg. The excess water was removed by drying with paper towel and once tapping the specimen on each end. The specimen was then immediately weighed. The water absorption was derived as follows: Water absorption (%)=[(weight of wet foam−weight of foam before submersion)/(weight of foam before submersion)]×100.

The composition at issue is formed into a shaped article, using fabrication methods such as profile extrusion. The extruded article can further be converted into a foamed or cellular article by heating the extruded profile in a fluidized sand bath (such using Techne Industrial Fluidized Bath, model IFB-51) at 200° C. and for a time of "t95+3" minutes (t95 is defined above).

Compression Set (%, 22 h at 100° C.) of the non-foamed article was measured in accordance with ASTM D395. Samples were cured at 180° C. for a time of "t90+5" minutes, under 500 psi (3.447 MPa). The t90 is defined above. Sample size is 13 mm in diameter and 6 mm in thickness.

Compression set (%, 22 h, 100° C.) of foamed article was determined according to ASTM D1056 (Sec 49-55). Samples were cured at 200° C. for a time of "t95+3" minutes, in fluidized sand bath.

Melt Viscosities and Tan Delta Polymer viscosities and tan delta were measured in pascal-second at shear rates within a range of 0.1 to 100 radian per second (rad/sec) and at 190° C. under a nitrogen atmosphere using a dynamic mechanical spectrometer such as a RMS-800 or ARES from This test is a melt test done on a disk (25 mm) specimen cut from a ⅛ inch thick specimen, typically from an injection molded ASTM D-790 tensile dog bone specimen. Injection molded conditions will vary depending upon the material being molded. Ethylene-based interpolymers are generally molded from 10 to 40 cc/sec, at melt temperatures from 190° C. to 230° C. The sample was placed between the two parallel plates of the dynamic mechanical spectrometer.

The following examples illustrate, but do not, either explicitly or by implication, limit the present invention.

EXPERIMENTAL

Table 1 lists some EPDM interpolymers (B) which have the following characteristics: (1). $M_z(abs)/M_z(Conv)$ values lower than 1.3; (2). $M_z(BB)/M_w(abs)$ values higher than 1.6, but less than 2.5; and (3). $M_w(abs)$ values lower than 350,000 g/mole. Comparative EPDM interpolymers are shown in Table 2. The ENB levels (wt %) were determined by FTIR.

The $M_n$, $M_w$ and $M_z$=number-average molecular weight, weight-average molecular weight, and z-average molecular weight (in g/mole), respectfully, obtained via SEC GPC. The $M_w(abs)$, $M_z(BB)$ and $M_z(abs)$ are average molecular weight values obtained via Laser Light Scattering according to Yau and Gillespie, Polymer, 42, 8947-8958 (2001). Table 2 lists comparative EPDM interpolymers.

TABLE 1

| | | | | | | | | |
|---|---|---|---|---|---|---|---|---|
| Examples of EPDM interpolymers (B) | | | | | | | | |
| | | Conventional GPC | | Absolute GPC from Light Scattering | | | Ratio | |
| EPDM Polymers | ENB wt % | Mn | Mz | Mw (abs) | Mz (BB) | Mz (abs) | Mz (abs)/ Mz (conv) | Mz (BB)/ Mw (abs) |
| EPDM 5565 | 7.5 | 54,090 | 434,100 | 201,690 | 457,900 | 468,400 | 1.08 | 2.27 |
| EPDM 4770 | 5.0 | 47,440 | 357,600 | 186,160 | 412,900 | 413,900 | 1.16 | 2.22 |

TABLE 1-continued

Examples of EPDM interpolymers (B)

| EPDM Polymers | ENB wt % | Conventional GPC Mn | Conventional GPC Mz | Absolute GPC from Light Scattering Mw (abs) | Absolute GPC from Light Scattering Mz (BB) | Absolute GPC from Light Scattering Mz (abs) | Ratio Mz (abs)/ Mz (conv) | Ratio Mz (BB)/ Mw (abs) |
|---|---|---|---|---|---|---|---|---|
| EPDM 4640 | 5.0 | 36,900 | 334,600 | 161,840 | 382,600 | 397,400 | 1.19 | 2.36 |
| EPDM 4570 | 5.0 | 62,260 | 365,600 | 206,140 | 397,600 | 428,500 | 1.17 | 1.93 |
| EPDM 46100 | 4.5 | 75,260 | 374,100 | 199,450 | 372,700 | 376,600 | 1.01 | 1.87 |
| EPDM 46140 | 4.9 | 123,960 | 510,400 | 333,030 | 543,700 | 597,400 | 1.17 | 1.63 |
| EPDM 47100 | 4.9 | 66,730 | 279,600 | 177,520 | 300,300 | 307,300 | 1.10 | 1.69 |

TABLE 2

Comparative Examples of EPDM Interpolymers

| Polymers | ENB wt % | Conventional GPC Mn | Conventional GPC Mz | Absolute GPC from Light Scattering Mw (abs) | Absolute GPC from Light Scattering Mz (BB) | Absolute GPC from Light Scattering Mz (abs) | Ratio Mz (abs)/ Mz (conv) | Ratio Mz (BB)/ Mw (abs) |
|---|---|---|---|---|---|---|---|---|
| VISTALON 8600 | 8.9 | 57,720 | 420,300 | 324,670 | 485,400 | 1,027,700 | 2.45 | 1.50 |
| VISTALON 8800 | 10 | 72,830 | 490,000 | 477,730 | 560,700 | 1,230,900 | 2.51 | 1.17 |
| KELTAN 7341 | 7.5 | 93,600 | 531,200 | 475,320 | 581,300 | 1,213,600 | 2.28 | 1.22 |
| KELTAN 4903Z | 9 | 69,630 | 868,400 | 393,730 | 1,051,900 | 1,134,000 | 1.31 | 2.67 |
| KELTAN 4703 | 9 | 56,520 | 333,300 | 230,590 | 351,000 | 525,100 | 1.58 | 1.52 |

Some EPDM interpolymers (A) of the invention are formed by the formulations as shown in Tables 3 and 4.

TABLE 3

Exemplary Formulations for EPDM interpolymers (A) of this invention (34-1 through 9). All component amounts are weight parts.

| Component | EX. 34-1 | EX. 34-2 | EX. 34-3 | EX. 34-4 | EX. 34-5 | EX. 34-6 | EX. 34-7 | EX. 34-8 | EX. 34-9 |
|---|---|---|---|---|---|---|---|---|---|
| EPDM 5565 | | | 50 | 100 | 100 | 100 | 100 | 100 | 100 |
| EPDM 4570 | 100 | 100 | 50 | | | | | | |
| VUL CUP 40KE* | | | | | | | 0.10 | 0.20 | 0.30 |
| DPO BSA** | 0.325 | 0.433 | 0.433 | 0.217 | 0.325 | 0.433 | | | |
| Weight ratio of active peroxide to base EPDM | | | | | | | 0.0004 | 0.0008 | 0.0012 |

*VUL CUP 40KE is an α,α'-bis(tert-butylperoxy)-diisopropylbenzene (40 wt % active bisperoxide supported on Burgess KE Clay), available from GEO Specialty Chemicals.
**The Azide agent DPO BSA is a molecular melt mixture of IRGANOX 1010 (3.3 parts) with BSA (1 part). See United States patent 7,326,361, 02/05/2008.

TABLE 4

More Formulations for EPDM Interpolymer (A) (42-3 through 8) and
Comparative Formulations. All component amounts are weight parts.

| Component | Comp. EX. 42-1 | Comp. EX. 42-2 | EX. 42-3 | EX. 42-4 | EX. 42-5 | EX. 42-6 | EX. 42-7 | EX. 42-8 |
|---|---|---|---|---|---|---|---|---|
| EPDM 5565 | | 100 | | 100 | | 100 | 100 | 100 |
| EPDM 4570 | 100 | | 100 | | 100 | | | |
| PARALUX 6001R* | 80 | 80 | 80 | 80 | 80 | 80 | 80 | 80 |
| ATOMITE** | | | | | | | | 40 |
| VUL CUP 40KE | | | 0.0875 | 0.0875 | | | | |
| DPO BSA | | | | | 0.2598 | 0.2598 | 0.3248 | 0.3248 |

*PARALUX 6001R is a mineral oil, available from Chevron U.S.A. Inc..
**ATOMITE is CaCO3.

Procedure (for all above formulations 34-1 through 9 and 42-1 through 8)
1. The needed amount of EPDM resin was weighed. The coupling agent (DPO or VUL CUP 40KE) was weighed in a small plastic bag.
2. The PARALUX 6001 (if needed) was weighed in a glass bottle.
3. The polymer, the coupling agent (where applicable), and then the oil, where applicable, were loaded into a KOBELCO mixer (at low temperature of about 120° C.).
4. The mixer was cooled via a cooling water jacket around the mixer. The mixer contents were heated to about 180° C. (for VUL CUP 40KE-containing samples) or 185-190° C. (for DPO BSA-containing samples) by increasing the shear RPM gradually. The target temperature was maintained for five minutes.
5. The mixing was terminated, and the mixer was opened, and the sample was collected and press into slab using a roll mill (Reliable Rubber & Plastic Machinery Co. SN4910).

Figure 1:
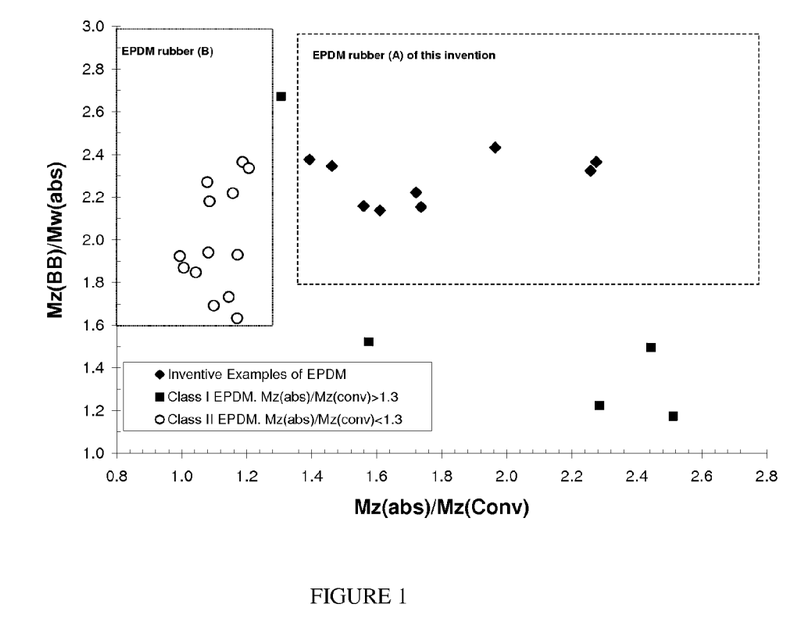
FIG. 1 depicts the molecular structure characteristics of the inventive EPDM interpolymers (A) and comparative EPDM interpolymers (B) and other EPDM rubbers (labeled as Class I EPDM).

The GPC molecular structure data for the inventive EPDM interpolymers (A) and comparative interpolymers are shown in Tables 5 and 6. The molecular structure characteristics of the inventive EPDM interpolymers (A) and comparative EPDM interpolymers (B) and other EPDM interpolymers (labeled as Class I EPDM) are illustrated in FIG. 1.

TABLE 5

GPC Results of Exemplary Examples for EPDM Interpolymers (A)

| | Conventional GPC | | Absolute GPC from Light Scattering | | | Ratio | |
|---|---|---|---|---|---|---|---|
| Polymer | Mn | Mz | Mw (abs) | Mz (BB) | Mz (abs) | Mz (abs)/ Mz (conv) | Mz (BB)/ Mw (abs) |
| Ex. 34-1 | 68550 | 564600 | 299900 | 645900 | 980500 | 1.74 | 2.15 |
| Ex. 34-2 | 75170 | 753600 | 384980 | 855200 | 1297000 | 1.72 | 2.22 |
| Ex. 34-3 | 71560 | 961800 | 497130 | 1154600 | 2171700 | 2.26 | 2.32 |
| Ex. 34-4 | 65420 | 658100 | 297270 | 697300 | 962400 | 1.46 | 2.35 |
| Ex. 34-5 | 64970 | 887900 | 429160 | 1043800 | 1744300 | 1.96 | 2.43 |
| Ex. 34-6 | 61280 | 1264100 | 611330 | 1445400 | 2876300 | 2.28 | 2.36 |
| Ex. 34-7 | 52480 | 326600 | 177750 | 380000 | 525800 | 1.61 | 2.14 |
| Ex. 34-8 | 49730 | 328500 | 180140 | 388700 | 512400 | 1.56 | 2.16 |
| Ex. 34-9 | 44010 | 408600 | 186150 | 442300 | 569400 | 1.39 | 2.38 |

TABLE 6

GPC Results of Exemplary Examples for EPDM Interpolymers (A)

| | Conventional GPC | | Absolute GPC from Light Scattering | | | Ratio | |
|---|---|---|---|---|---|---|---|
| Polymer | Mn | Mz | Mw (abs) | Mz (BB) | Mz (abs) | Mz (abs)/ Mz (conv) | Mz (BB)/ Mw (abs) |
| Comp. Ex. 42-1 | 64320 | 324600 | 210370 | 343300 | 433400 | 1.34 | 1.63 |
| Comp. Ex. 42-2 | 68420 | 413500 | 222480 | 406200 | 516700 | 1.25 | 1.83 |
| Ex. 42-3 | 62510 | 391500 | 242050 | 440300 | 653400 | 1.67 | 1.82 |
| Ex. 42-4 | 68140 | 613100 | 299220 | 674600 | 1016300 | 1.66 | 2.25 |
| Ex. 42-5 | 66210 | 552300 | 308900 | 623600 | 967800 | 1.75 | 2.02 |
| Ex. 42-6 | 75210 | 686800 | 331290 | 747700 | 1156800 | 1.68 | 2.26 |
| Ex. 42-7 | 77870 | 714400 | 386150 | 868800 | 1505500 | 2.11 | 2.25 |
| Ex. 42-8 | 70510 | 545800 | 274840 | 396000 | 961500 | 1.76 | 1.44 |

Vulcanized but non-foamed EPDM articles were produced with the following formulations as shown in Table 7.

Vulcanized and foamed EPDM articles were produced with the following formulations as shown in Table 8.

40 rpm, without additional heat input. Compounding was halted, and the pre-compounding materials were allowed to cool in air, after the material temperature reached 160° C. After the pre-compounded material was cooled, the remain-

TABLE 7

Formulations of Inventive Examples and Comparative Examples for Vulcanization - Non-foamed Articles (D39-1 to 13)
Amounts of components in weight parts.

| Ingredients (parts per hundred) | Comp. Ex. D39-13 | Comp. Ex. D39-1 | Comp. Ex. D39-2 | Comp. Ex. D39-3 | Ex. D39-4 | Ex. D39-5 | Ex. D39-6 | Ex. D39-7 | Ex. D39-8 | Ex. D39-9 | Ex. D39-10 | Ex. D39-11 | Ex. D39-12 |
|---|---|---|---|---|---|---|---|---|---|---|---|---|---|
| EPDM 46100 | 128 | | | | | | | | | | | | 64 |
| EPDM 5565 | | 100 | | | | | | | | | 70 | 70 | |
| KELTAN 4903 | | | 100 | | | | | | | | | | |
| VISTALON 8600 | | | | 100 | | | | | | | | | |
| Inventive Example 34-2 | | | | | 100 | | | | | | | | |
| Inventive Example 34-3 | | | | | | 100 | | | | | | | |
| Inventive Example 34-4 | | | | | | | 100 | | | | | | |
| Inventive Example 34-6 | | | | | | | | 100 | | | 30 | | 50 |
| Inventive Example 34-8 | | | | | | | | | 100 | | | | |
| Inventive Example 34-9 | | | | | | | | | | 100 | | 30 | |
| Carbon Black or CB (parts) | 52 | 80 | 80 | 80 | 80 | 80 | 80 | 80 | 80 | 80 | 80 | 80 | 66 |
| Oil (parts) | 80 | 80 | 80 | 80 | 80 | 80 | 80 | 80 | 80 | 80 | 80 | 80 | 80 |
| CaCO3 (parts) | 40 | 40 | 40 | 40 | 40 | 40 | 40 | 40 | 40 | 40 | 40 | 40 | 40 |
| Sulfur(parts) | 1.05 | 1.05 | 1.05 | 1.05 | 1.05 | 1.05 | 1.05 | 1.05 | 1.05 | 1.05 | 1.05 | 1.05 | 1.05 |
| ZnO (parts) | 4.2 | 4.2 | 4.2 | 4.2 | 4.2 | 4.2 | 4.2 | 4.2 | 4.2 | 4.2 | 4.2 | 4.2 | 4.2 |
| Stearic acid (parts) | 1 | 1 | 1 | 1 | 1 | 1 | 1 | 1 | 1 | 1 | 1 | 1 | 1 |
| other (parts) | 7 | 7 | 7 | 7 | 7 | 7 | 7 | 7 | 7 | 7 | 7 | 7 | 7 |
| Accelerators (parts) | 5 | 5 | 5 | 5 | 5 | 5 | 5 | 5 | 5 | 5 | 5 | 5 | 5 |
| Total ENB in EPDM (wt %) | 4.9 | 7.5 | 9 | 8.9 | 5 | 6.25 | 7.5 | 7.5 | 7.5 | 7.5 | 7.5 | 7.5 | 6.2 |

CB = SPHERON SP5000A (available from Cabot Corporation);
Oil - SUNPAR 2280 (available from Sun Oil Company Corp.);
ATOMITE is CaCO3 wt % ENB determined by FTIR

TABLE 8

Formulations of Inventive Examples and Comparative Examples for Vulcanization - Foamed Articles (D42-1 through 13)
Amounts of components in weight parts.

| Ingredients (parts per hundred) | Comp. Ex. D42-13 | Comp. Ex. D42-1 | Comp. Ex. D42-2 | Comp. Ex. D42-3 | Ex. D42-4 | Ex. D42-5 | Ex. D42-6 | Ex. D42-7 | Ex. D42-8 | Ex. D42-9 | Ex. D42-10 | Ex. D42-11 | Ex. D42-12 |
|---|---|---|---|---|---|---|---|---|---|---|---|---|---|
| EPDM 46100 | 128 | | | | | | | | | | | | 64 |
| NORDEL IP 5565 | | 100 | | | | | | | | | 70 | 70 | |
| KELTAN 4903 | | | 100 | | | | | | | | | | |
| VISTALON 8600 | | | | 100 | | | | | | | | | |
| Inventive Example 34-2 | | | | | 100 | | | | | | | | |
| Inventive Example 34-3 | | | | | | 100 | | | | | | | |
| Inventive Example 34-4 | | | | | | | 100 | | | | | | |
| Inventive Example 34-6 | | | | | | | | 100 | | | 30 | | 50 |
| Inventive Example 34-8 | | | | | | | | | 100 | | | | |
| Inventive Example 34-9 | | | | | | | | | | 100 | | 30 | |
| CB (parts) | 52 | 80 | 80 | 80 | 80 | 80 | 80 | 80 | 80 | 80 | 80 | 80 | 66 |
| Oil (parts) | 80 | 80 | 80 | 80 | 80 | 80 | 80 | 80 | 80 | 80 | 80 | 80 | 80 |
| CaCO3 (parts) | 40 | 40 | 40 | 40 | 40 | 40 | 40 | 40 | 40 | 40 | 40 | 40 | 40 |
| Sulfur (parts) | 1.05 | 1.05 | 1.05 | 1.05 | 1.05 | 1.05 | 1.05 | 1.05 | 1.05 | 1.05 | 1.05 | 1.05 | 1.05 |
| ZnO (parts) | 4.2 | 4.2 | 4.2 | 4.2 | 4.2 | 4.2 | 4.2 | 4.2 | 4.2 | 4.2 | 4.2 | 4.2 | 4.2 |
| Stearic acid (parts) | 1 | 1 | 1 | 1 | 1 | 1 | 1 | 1 | 1 | 1 | 1 | 1 | 1 |
| Foaming agent (parts) | 3.5 | 3.5 | 3.5 | 3.5 | 3.5 | 3.5 | 3.5 | 3.5 | 3.5 | 3.5 | 3.5 | 3.5 | 3.5 |
| other (parts) | 7 | 7 | 7 | 7 | 7 | 7 | 7 | 7 | 7 | 7 | 7 | 7 | 7 |
| Accelerators (parts) | 5 | 5 | 5 | 5 | 5 | 5 | 5 | 5 | 5 | 5 | 5 | 5 | 5 |
| Total ENB in EPDM (wt %) | 4.9 | 7.5 | 9 | 8.9 | 5 | 6.25 | 7.5 | 7.5 | 7.5 | 7.5 | 7.5 | 7.5 | 6.2 | wt % ENB determined by FTIR

The formulations (D39—1 to 13) were prepared as follows. The EPDM, oil, CaCO3, carbon black, ZnO, and stearic acid (HSt) were compounded via Banbury, at a mix speed of 40 rpm. Compounding was stopped, after the mate- ing components (sulfur plus other components) were introduced to the pre-compound, via a Banbury, mixing at a mix speed of 40 rpm. Compounding was stopped, after the material temperature reached 100° C. The formulation was removed from the mixer, and cooled at room temperature. The Mooney viscosity and curing data were tested according to ASTM D 1646 and ASTM D 5289 for the formulations. The data are listed in Table 9.

TABLE 9

Rheology and Cure Behavior Data

|  | Mooney Viscosity, ASTM D1646 ML 1 + 4 @ 100° C. [MU] | Mooney Scorch, ASTM D 1646, 125° C./ 30 min | | MDR, 160° C./ 30 min, ASTM D5289 | | MDR, 200° C./ 5 min, ASTM D5289 | | Compression Set 100° C., 22 hr [%] |
|---|---|---|---|---|---|---|---|---|
|  |  | t5 [M. m] | t35 [M. m] | t10 [min] | t90 [min] | t10 [min] | t90 [min] |  |
| Comp. Ex. D39-13 | 55.5 | 5.8 | 7.39 | 0.84 | 9.07 | 0.28 | 1.26 | 20 |
| Comp. Ex. D39-1 | 36.2 | 5.44 | 6.81 | 0.76 | 10.33 | 0.26 | 1.3 | 20 |
| Comp. Ex. D39-2 | 39 | 5.19 | 6.54 | 0.71 | 9.32 | 0.25 | 1.12 | 18 |
| Comp. Ex. D39-3 | 38.3 | 4.97 | 6.21 | 0.66 | 8.26 | 0.26 | 1.14 | 20 |
| Ex. D39-4 | 44.9 | 5.87 | 7.5 | 0.84 | 8.79 | 0.28 | 1.21 | 25 |
| Ex. D39-5 | 46.9 | 5.57 | 7.1 | 0.81 | 8.01 | 0.28 | 1.18 | 22 |
| Ex. D39-6 | 40.6 | 5.29 | 6.58 | 0.72 | 8.64 | 0.26 | 1.37 | 19 |
| Ex. D39-7 | 42.9 | 5.12 | 6.43 | 0.72 | 7.61 | 0.26 | 1.14 | 21 |
| Ex. D39-8 | 35.4 | 5.74 | 7.05 | 0.78 | 7.4 | 0.28 | 1.05 | 23 |
| Ex. D39-9 | 37.1 | 5.79 | 7.2 | 0.83 | 7.48 | 0.27 | 1.04 | 22 |
| Ex. D39-10 | 39 | 5.6 | 6.96 | 0.76 | 8.18 | 0.26 | 1.14 | 20 |
| Ex. D39-11 | 36.7 | 5.71 | 7.03 | 0.76 | 8.01 | 0.27 | 1.16 | 21 |
| Ex. D39-12 | 51 | 5.37 | 6.74 | 0.74 | 8.55 | 0.27 | 1.2 | 21 |

From the data in Table 9, the Mooney viscosity of most inventive examples, except inventive examples D39-08 and D39-11, were higher than that of comparative examples D39-01 to D39-03 (based on EPDM 5565, KELTAN 4903 and VISTALON 8600, respectively). The scorch time of most inventive examples, except inventive example D39-07, was observed to be longer than comparative examples D39-02 and D39-03 (based on KELTAN 4903 and VISTALON 8600, with ENB content of 9 wt % and 8.9 wt %, respectively). Higher Mooney viscosity and longer scorch time are desired for improved possibility during foaming.

From curing data at 160° C. and 200° C., the inventive examples showed comparable or faster curing rates than that of the comparative examples. Inventive examples D39-04 and D39-08 showed higher compression set loss. Other inventive examples showed comparable compression set loss, as compared to the comparative examples. Inventive examples D39-05 through D39-12 showed comparable compression set values to those of comparative examples D39-02 and D39-03, which had significantly higher ENB content at 9 wt % and 8.9 wt %, respectively.

The formulations of D42-01 to D42-13 were prepared similarly to D39-01 to D39-13, but with foaming agent added to the formulations. After mixing in a Banbury mixer, and cooling to room temperature, the compounds were fed to a single-screw extruder with a round die, at a melt temperature of 100° C., and at a line speed of 9 m/min. The extruded strands were cured and foamed in a fluidized sand bath at 200° C. The time for the cure and foaming for each samples was set at t95+3 minutes (t95 defined above). The properties of the foam samples are listed in Table 10. From the data in Table 10, it can be seen that all inventive samples showed comparable or lower compression set values than comparative examples D42-13, D42-1 and D42-3. All samples exhibited comparable foam density.

Figure 2:
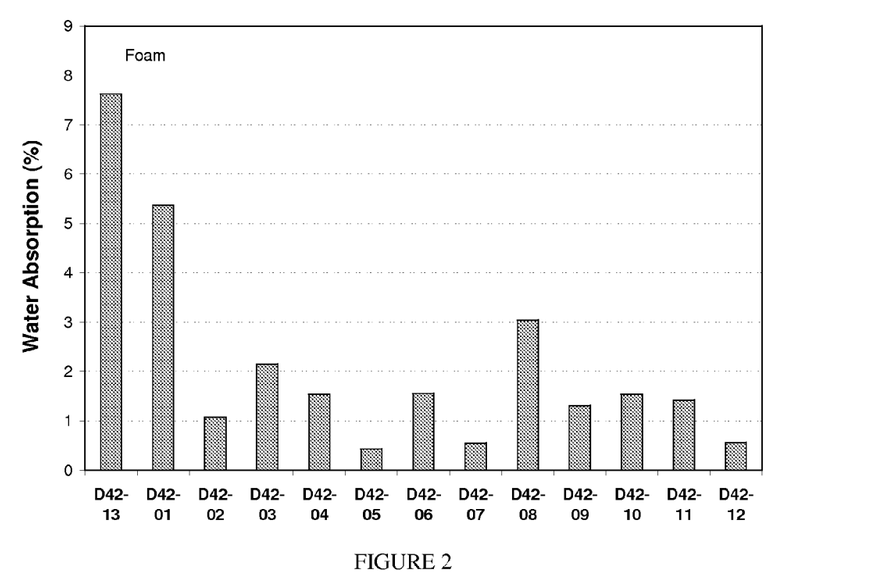
FIG. 2 depicts water absorption values of cured, foamed EPDM compositions of this invention and comparative foams.

Water absorption values of cured, foamed EPDM compositions of this invention are compared with that of comparative examples in FIG. 2.

Lower water absorption is desirable for foam to be used for a variety of applications, including automotive sealing materials. It is unexpected that inventive examples D42-05, D42-07 and D42-12 showed the lowest water uptake levels. Inventive examples D42-04, D42-06, D42-09 and D42-11 showed lower water absorption than comparative examples D42-13, D42-01 and D42-03. It is noted that Comparative examples D42-01 and D42-03 have 7.5 wt % and 9 wt % ENB in the EPDM polymers, respectively. The inventive examples have generally ENB content of 5-7.5 wt % in the EPDM polymers. In particular, Inventive examples D42-04, D42-05 and D42-12 have significantly lower level of ENB content at 5, 6.26 and 6.2 wt %, respectively, in the EPDM polymers. The inventive examples showed unexpectedly good (low) water absorption in the foamed articles, even with generally lower ENB content or lower molecular weight ($M_w$(abs)) of the EPDM rubbers.

TABLE 10

Properties of Foamed Strand Samples of the Inventive and Comparative Examples

|  | Specific Gravity, ASTM D792 [g/cc] | Compression set-Foam 22 h @ 70° C. [%] | H2O Absorption- Foam ASTM D470, 3 min @ 23° C. [%] |
|---|---|---|---|
| Comp. Ex. D42-13 | 0.5134 | 46 | 7.62 |
| Comp. Ex. D42-1 | 0.4783 | 47 | 5.37 |
| Comp. Ex. D42-2 | 0.5148 | 42 | 1.07 |
| Comp. Ex. D42-3 | 0.4802 | 46 | 2.15 |
| Ex. D42-4 | 0.4986 | 46 | 1.54 |
| Ex. D42-5 | 0.5348 | 44 | 0.43 |
| Ex. D42-6 | 0.5026 | 45 | 1.56 |
| Ex. D42-7 | 0.5567 | 45 | 0.55 |
| Ex. D42-8 | 0.472 | 42 | 3.04 |
| Ex. D42-9 | 0.4871 | 45 | 1.31 |
| Ex. D42-10 | 0.4882 | 43 | 1.54 |

TABLE 10-continued

Properties of Foamed Strand Samples of the Inventive and Comparative Examples

|  | Specific Gravity, ASTM D792 [g/cc] | Compression set-Foam 22 h @ 70° C. [%] | H2O Absorption-Foam ASTM D470, 3 min @ 23° C. [%] |
|---|---|---|---|
| Ex. D42-11 | 0.5022 | 44 | 1.42 |
| Ex. D42-12 | 0.5394 | 43 | 0.56 |

Rheology Study

Table 11 below list the melt viscosities at a temperature of 190° C. of Inventive Examples (34-1 through 9). The percent changes in melt viscosity at 0.1 rad/sec (η0.1) before and after treatment with coupling agent, is calculated as shown in Equation A.

% Change in η0.1={[η0.1(after coupling)−η0.1(before coupling)]/η0.1(before coupling)×100}  (Eqn. A)

TABLE 11

Melt Viscosities at T = 190° C.

| Sample | η 0.1 (Pa·sec) | η 100 (Pa·sec) | η 0.1/η 100 | % Change in η 0.1 |
|---|---|---|---|---|
| EPDM 5565 Control for 34-4 to 9 | 85029 | 3352 | 25.4 | 0 |
| EPDM 4570 Control for 34-1 to 2 | 91041 | 3544 | 25.7 | 0 |
| 34-1 | 554710 | 4576 | 121 | 509 |
| 34-2 | 670300 | 3846 | 174 | 636 |
| 34-3 | 566270 | 3430 | 165 | na |
| 34-4 | 361310 | 4164 | 87 | 325 |
| 34-5 | 389520 | 3157 | 123 | 358 |
| 34-6 | 476010 | 2915 | 163 | 460 |
| 34-7 | 243490 | 3213 | 76 | 186 |
| 34-8 | 587260 | 3434 | 171 | 591 |
| 34-9 | 1069000 | 3940 | 271 | 1157 |

η 0.1 is the melt viscosity at 0.1 rad/sec
η 100 is the melt viscosity at 100 rad/sec The inventive examples of this invention, as shown in Table 11, exhibited relatively high rheology ratio (η0.1/η100) of 50 or higher, compared to comparative/control EPDM rubbers of les than 30. The percent changes in η0.1 at 190° C. upon coupling agent modification of the inventive examples are all above 150%, as measured on neat EPDM rubber.

Table 12 lists the melt viscosities (T=190 C) for the Inventive Examples (42-3 through 8). The following Inventive Examples (42-3 through 8) and Controls (42-1 and 42-2) contains mineral oil (42-1 through 8) and inorganic filler CaCO3 (42-8). The percent changes in melt viscosity of η0.1 is expressed by the following Equation A:

% Change in η0.1={[η0.1(after coupling)−η0.1(before coupling)]/η0.1(before coupling)×100}  (Eqn. A)

TABLE 12

Melt Viscosities (T = 190 C.)

| Sample | η 0.1 (Pa·sec) | η 100 (P·sec) | η 0.1/η 100 | % Change in η 0.1 |
|---|---|---|---|---|
| 42-1 Control (42-3 and 5) | 16062 | 910 | 17.6 | 0.0 |
| 42-2 Control (42-4, 6-8) | 14536 | 860 | 16.9 | 0.0 |
| 42-3 | 35351 | 1094 | 32.3 | 120 |
| 42-4 | 36013 | 1044 | 34.5 | 148 |
| 42-5 | 31937 | 1077 | 29.6 | 99 |
| 42-6 | 26565 | 912 | 29.1 | 83 |
| 42-7 | 30863 | 929 | 33.2 | 112 |
| 42-8 | 22451 | 984 | 22.8 | 55 |

η 0.1 is the melt viscosity at 0.1 rad/sec
η 100 is the melt viscosity at 100 rad/sec The inventive examples of this invention, as shown in Table 12, exhibited relatively high rheology ratio (η0.1/η100) of 22 or higher, compared to comparative/control EPDM rubbers of les than 18. The percent changes in η0.1 at 190° C. upon coupling agent modification of the inventive examples are all above 50%, as measured on the oil-containing EPDM rubber. The percent changes in η0.1 at 190° C. can further be distinguished by:

% Change in η0.1 at 190° C.>150−2×(I+K), where I and K are the weight percent of the oil and weight percent of the inorganic filler such as calcium carbonate, respectively.

Although the invention has been described in certain detail through the preceding specific embodiments, this detail is for the primary purpose of illustration. Many variations and modifications can be made by one skilled in the art, without departing from the spirit and scope of the invention, as described in the following claims.

The invention claimed is:

1. A composition comprising an ethylene/α-olefin/non-conjugated diene interpolymer, which has the following properties: an $M_z(abs)/M_z(Conv)$ value greater than 1.35; an $M_z(BB)/M_w(abs)$ value greater than 1.6; and a non-conjugated diene content less than 10 weight percent, based on the total weight of the interpolymer; a viscosity ratio (η0.1/η100), at 190° C., from 70 to 300; and a gel content less than 3 weight percent; and
    wherein the ethylene/α-olefin/non-conjugated diene interpolymer is formed by reacting at least the following: a base ethylene/α-olefin/non-conjugated diene interpolymer and a coupling agent, and
    wherein the ethylene/α-olefin/non-conjugated diene interpolymer has a percent change in melt viscosity (0.1 rad/sec, 190° C.) greater than 130%, and a Mooney viscosity (ML 1+4 at 125° C.) greater than 60, and
    wherein the base ethylene/α-olefin/non-conjugated diene interpolymer has the following properties: an $M_z(abs)/M_z(Conv)$ value less than 1.3; an $M_z(BB)/M_w(abs)$ value greater than 1.6 but less than 2.5; and an $M_w(abs)$ value less than 350,000 g/mole.

2. The composition of claim 1, wherein the interpolymer has a Mooney viscosity (ML 1+4 at 125° C.) greater than 70.

3. The composition of claim 1, wherein the interpolymer has a Mooney viscosity (ML 1+4 at 125° C.) less than 300.

4. The composition of claim 1, wherein the interpolymer has a melt viscosity at 190° C., greater than $2.0 \times 10^5$ Pa·sec.

5. The composition of claim 1, wherein the interpolymer has a gel content less than 2 weight percent.

6. The composition of claim 1, wherein the interpolymer has an ethylene content from 45 to 95 weight percent, based on the weight of the interpolymer.

7. The composition of claim 1, wherein the weight ratio of ethylene to α-olefin in the interpolymer is less than 2.5.

8. The composition of claim 1, wherein the α-olefin of the interpolymer is propylene.

9. The composition of claim 1, wherein the diene of the interpolymer is selected from 5-ethylidene-2-norbornene (ENB), dicyclopentadiene or 1,4-hexadiene.

10. The composition of claim 1, wherein the ethylene/α-olefin/non-conjugated diene interpolymer has a gel content less than 1 weight percent.

11. The composition of claim 1, wherein the ethylene/α-olefin/non-conjugated diene interpolymer has a gel content less than 0.5 weight percent.

12. The composition of claim 1, wherein the base ethylene/α-olefin/non-conjugated diene interpolymer has a molecular weight distribution (Mw/Mn) from 1.5 to 2.8, as determined by conventional GPC.

13. The composition of claim 1, wherein the base ethylene/α-olefin/non-conjugated diene interpolymer has a Mooney viscosity (ML 1+4 at 125° C.) greater than 60.

14. The composition of claim 1, wherein the composition comprises the following: from 25 to 70 wt % of the ethylene/α-olefin/non-conjugated diene interpolymer; from 25 to 60 wt % of a process oil; from 0 to 60 wt % of carbon black; from 0 to 50 wt % of calcium carbonate and/or other inorganic fillers; from 0 to 7 wt % of a sulfur based cure/vulcanization agents; and from 0 to 7 wt % of a chemical foaming agent; each weight percent based on the total weight of the composition.

* * * * *